United States Patent
Takeda et al.

(10) Patent No.: US 9,014,234 B2
(45) Date of Patent: Apr. 21, 2015

(54) COMMUNICATION SYSTEM AND COMMUNICATION METHOD

(75) Inventors: Teruhito Takeda, Hyogo (JP); Mitsuru Tanabe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/005,031

(22) PCT Filed: Mar. 15, 2012

(86) PCT No.: PCT/JP2012/056625
§ 371 (c)(1),
(2), (4) Date: Sep. 13, 2013

(87) PCT Pub. No.: WO2012/124751
PCT Pub. Date: Sep. 20, 2012

(65) Prior Publication Data
US 2014/0003468 A1    Jan. 2, 2014

(30) Foreign Application Priority Data
Mar. 17, 2011  (JP) .................................. 2011-059698

(51) Int. Cl.
*H04B 1/7156* (2011.01)
*H04B 1/7073* (2011.01)

(52) U.S. Cl.
CPC ............ *H04B 1/7156* (2013.01); *H04B 1/7073* (2013.01)

(58) Field of Classification Search
CPC ............. H04B 1/7073; H04B 1/70735; H04B 1/7075; H04B 1/70751; H04B 1/70752; H04B 1/709; H04B 1/7093; H04B 1/7156; H04B 2001/7073; H04B 2001/7085; H04B 2001/709; H04B 2001/7093; H04B 2001/7156; H04L 7/0012; H04L 7/002; H04L 7/0025; H04L 7/0029; H04L 7/10

USPC ......... 375/134, 141–145, 149, 150, 152, 224, 375/259, 354, 356, 367, 368; 370/349, 350, 370/470–474, 504, 509, 512, 514, 515; 455/500, 502, 503, 68, 70, 88
See application file for complete search history.

(56) References Cited

U.S. PATENT DOCUMENTS 5,912,644 A  *  6/1999  Wang ............................ 342/457
6,366,603 B1     4/2002  Uchida et al.
(Continued)

FOREIGN PATENT DOCUMENTS

| JP | 7-16442 U | 3/1995 |
|----|-----------|--------|
| JP | 09-093155 A | 4/1997 |

(Continued)

OTHER PUBLICATIONS

International Search Report for corresponding International Application No. PCT/JP2012/056625 mailed Apr. 17, 2012.
Form PCT/ISA/237 for corresponding International Application No. PCT/JP2012/056625 dated Apr. 17, 2012.

*Primary Examiner* — Young T Tse
(74) *Attorney, Agent, or Firm* — Renner, Otto, Boisselle & Sklar, LLP

(57) ABSTRACT

A communication system comprises: a communication apparatus that is configured to transmit communication data, which includes a plurality of known synchronization symbols subjected to spread modulation with a spread code; and a communication apparatus that is configured to perform, when receiving the communication data, processing for detecting a synchronization timing, based on a correlation value between the received communication data and a reference signal. The communication apparatus comprises: a disturbing wave detection part configured to detect a period of a disturbing wave; a communication control part configured to set a transmission period of the synchronization symbol to be integer multiple of the period of the disturbing wave; and a transmission unit configured to transmit the communication data in which the transmission period of the synchronization symbol has been set by the communication control part.

17 Claims, 12 Drawing Sheets

(56) References Cited

U.S. PATENT DOCUMENTS

| | | |
|---|---|---|
| 7,860,154 B2 | 12/2010 | Hafuka |
| 2002/0159413 A1* | 10/2002 | Tsubouchi et al. ........... 370/335 |
| 2007/0291826 A1 | 12/2007 | Hafuka |
| 2010/0054116 A1* | 3/2010 | Ishii et al. ..................... 370/210 |

FOREIGN PATENT DOCUMENTS

| | | |
|---|---|---|
| JP | 11-46179 A | 2/1999 |
| JP | 2007-336152 A | 12/2007 |

* cited by examiner

FIG. 7 INTERPOLATION SYMBOL

| | | | | |
|---|---|---|---|---|
| PATTERN 1 | 0 | 0 | 0 | 0 |
| PATTERN 2 | 0 | 0 | 0 | 1 |
| PATTERN 3 | 0 | 0 | 1 | 0 |
| PATTERN 4 | 0 | 0 | 1 | 1 |
| PATTERN 5 | 0 | 1 | 0 | 0 |
| PATTERN 6 | 0 | 1 | 0 | 1 |
| PATTERN 7 | 0 | 1 | 1 | 0 |
| PATTERN 8 | 0 | 1 | 1 | 1 |
| PATTERN 9 | 1 | 0 | 0 | 0 |
| PATTERN 10 | 1 | 0 | 0 | 1 |
| PATTERN 11 | 1 | 0 | 1 | 0 |
| PATTERN 12 | 1 | 0 | 1 | 1 |
| PATTERN 13 | 1 | 1 | 0 | 0 |
| PATTERN 14 | 1 | 1 | 0 | 1 |
| PATTERN 15 | 1 | 1 | 1 | 0 |
| PATTERN 16 | 1 | 1 | 1 | 1 |

FIG. 9 INTERPOLATION SYMBOL

| | | | |
|---|---|---|---|
| PATTERN 1 | 0 | 0 | 0 |
| PATTERN 2 | 0 | 0 | 1 |
| PATTERN 3 | 0 | 1 | 0 |
| PATTERN 4 | 0 | 1 | 1 |
| PATTERN 5 | 1 | 0 | 0 |
| PATTERN 6 | 1 | 0 | 1 |
| PATTERN 7 | 1 | 1 | 0 |
| PATTERN 8 | 1 | 1 | 1 |

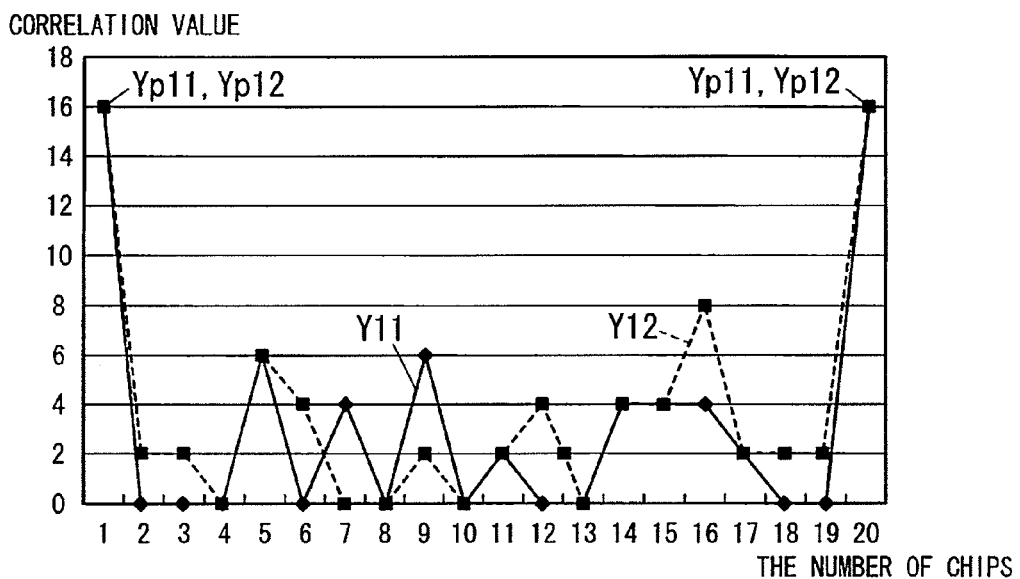

COMMUNICATION SYSTEM AND COMMUNICATION METHOD

TECHNICAL FIELD

The invention relates to a communication system using a spread code, and a communication method.

BACKGROUND ART

Currently there is a spread spectrum communication method, as a communication technology used for a communication system with a mobile phone or the like. In the spread spectrum communication method, the communication is performed by spreading energy to a bandwidth that is far wider than a bandwidth of a baseband signal being transmission information, using a spread code. Then, the spread spectrum communication method has advantages of: having little influence on other communication systems; receiving little interference from other communication systems; being strong to multipath; having high communication security; and the like.

Generally, in the spread spectrum communication, transmitted data includes a synchronization symbol for establishing communication, and a receiving device needs to correctly determine a timing for demodulation of received data, with this synchronization symbol. Therefore, the receiving device calculates a correlation value between a received signal and a spread code corresponding to a synchronization symbol, using a matched filter, and then detects a correlation peak value during a prescribed sampling period. In a header of a communication frame, a plurality of synchronization symbols is sequentially provided. The receiving device establishes synchronization at a correlation peak position that has been detected during a sampling period corresponding to an interval between adjacent symbols of the plurality of synchronization symbols. Here, in order to prevent influences by noises, only a correlation peak value exceeding a correlation threshold is adopted.

In order to further prevent erroneous detection of a symbol resulting from noises and the like, it has been also suggested that a width of a symbol detection window is controlled so as to be most appropriate and a correlation threshold is controlled so as to be most appropriate (e.g., see Japanese Patent Application Publication No. 2007-336152).

However, the technology in the above-mentioned document is based on the assumption that an initial synchronization establishment (initial synchronization acquisition) is correct. Therefore, with respect to the initial synchronization acquisition in this technology, there is fear that it is impossible to establish correct synchronization when a disturbing wave of which signal intensity has a periodicity is superimposed.

For example, in a case where a disturbing wave with a periodicity is not superimposed, as shown in FIG. 18A, a substantively constant correlation peak value is detected for each transmission period of the synchronization symbol, and therefore, in the initial synchronization acquisition, it is possible to establish correct synchronization, using a correlation threshold K100.

However, in a case where a disturbing wave with a periodicity is superimposed, as shown in FIG. 18B, waviness occurs, and therefore the correlation peak value also fluctuates in response to fluctuation in signal intensity of the disturbing wave, and there is fear that the correlation peak value falls below the correlation threshold K100. Thus, it is impossible to detect the correlation peak value for each transmission period of the synchronization symbol and to establish correct synchronization.

DISCLOSURE OF THE INVENTION

It is an object of the present invention to provide a communication system and a communication method, which can prevent influence by a disturbing wave with a periodicity and establish correct synchronization in an initial synchronization acquisition.

A communication system of the present invention comprises: a first communication apparatus configured to perform frequency conversion of communication data, which includes a plurality of known synchronization symbols subjected to spread modulation with a spread code, into a first frequency, and to transmit the communication data; and a second communication apparatus configured to perform frequency conversion of the received communication data into a second frequency, and then to perform processing for detecting a synchronization timing, based on a correlation value between the communication data and a reference signal that includes the synchronization symbol, wherein the first communication apparatus comprises: a disturbing wave detection part configured to detect information relevant to a period of a disturbing wave in which the frequency conversion into the second frequency has been performed; a communication control part configured to set a transmission period of the synchronization symbol in the second frequency to be integer multiple of the period of the detected disturbing wave; and a transmission unit configured to transmit the communication data in which the transmission period of the synchronization symbol has been set by the communication control part.

In this communication system, it is possible to prevent influence by a disturbing wave with a periodicity and establish correct synchronization in an initial synchronization acquisition.

In the present invention, preferably, the communication control part is configured to add an interpolation symbol to the synchronization symbol, the communication control part being configured to set a symbol length of the interpolation symbol so that a sum of a symbol length of the synchronization symbol and the symbol length of the interpolation symbol, in the second frequency, is integer multiple of the period of the detected disturbing wave.

In the present invention, preferably, the interpolation symbol is set as data in which a correlation value between a reception sequence of the communication data including at least a part of the interpolation symbol and the reference signal is the lowest.

In the present invention, preferably, the transmission unit is configured to provide, when transmitting the communication data, a transmission operation stop period for stopping transmission operation from transmission of the synchronization symbol until transmission of the next synchronization symbol, and wherein the communication control part is configured to set a time length of the transmission operation stop period so that a sum of a symbol length of the synchronization symbol and the transmission operation stop period, in the second frequency, is integer multiple of the period of the detected disturbing wave.

In the present invention, preferably, the communication control part is configured to set the symbol length of the synchronization symbol in the second frequency to be integer multiple of the period of the detected disturbing wave.

In the present invention, preferably, the disturbing wave detection part is configured: to transmit, from the transmission unit, a test packet sequentially selected from among a plurality of test packets, each of which being a test packet in which transmission intervals between the plurality of synchronization symbols are set constant in a single communication frame, the transmission intervals between the plurality of synchronization symbols in each of the plurality of test packets being different from the transmission intervals between the plurality of synchronization symbols in the other test packets; and to determine, when receiving a return signal which is returned by the second communication apparatus, which has received the test packet, upon detecting the synchronization timing, that each of the transmission intervals between the plurality of synchronization symbols of the test packet in the second frequency triggering the return signal is integer multiple of the period of the disturbing wave in which the frequency conversion into the second frequency has been performed, and then to stop processing for transmitting the test packet.

In the present invention, preferably, the disturbing wave detection part of the first communication apparatus is configured to transmit, from the transmission unit, a test packet sequentially selected from among a plurality of test packets, each of which being a test packet in which transmission intervals between the plurality of synchronization symbols are set constant in a single communication frame, the transmission intervals between the plurality of synchronization symbols in each of the plurality of test packets being different from the transmission intervals between the plurality of synchronization symbols in the other test packets, wherein the second communication apparatus is configured: to perform processing for detecting a synchronization timing with the received test packet; to add period information relevant to a detected period of the synchronization timing into a return signal; and to return the return signal, and wherein the disturbing wave detection part of the first communication apparatus is configured to determine that the detected period of the synchronization timing in the second frequency is integer multiple of the period of the disturbing wave in which the frequency conversion into the second frequency has been performed, based on the period information added into the return signal, and then to stop processing for transmitting the test packet.

In the present invention, preferably, the disturbing wave detection part of the first communication apparatus is configured to transmit, from the transmission unit, a test packet sequentially selected from among a plurality of test packets, each of which being a test packet in which transmission intervals between the plurality of synchronization symbols are set constant in a single communication frame, the transmission intervals between the plurality of synchronization symbols in each of the plurality of test packets being different from the transmission intervals between the plurality of synchronization symbols in the other test packets, wherein the second communication apparatus is configured: to perform processing for detecting a synchronization timing with the received test packet; to add period information relevant to a detected period of the synchronization timing into a return signal; and to return the return signal with the detected period of the synchronization timing, and wherein the disturbing wave detection part of the first communication apparatus is configured to determine, when a received period of the return signal in the second frequency is coincident with the period information added into the return signal, that the received period of the return signal in the second frequency is integer multiple of the period of the disturbing wave in which the frequency conversion into the second frequency has been performed, and then to stop processing for transmitting the test packet.

In the present invention, preferably, the disturbing wave detection part of the first communication apparatus is configured to transmit, from the transmission unit, a test packet, in which transmission intervals between the plurality of synchronization symbols are set different from each other in a single communication frame, wherein the second communication apparatus is configured: to perform processing for detecting a synchronization timing with the received test packet; and to return a return signal with a detected period of the synchronization timing, and wherein the disturbing wave detection part of the first communication apparatus is configured to determine that a received period of the return signal in the second frequency is integer multiple of the period of the disturbing wave in which the frequency conversion into the second frequency has been performed.

In the present invention, preferably, the disturbing wave detection part of the first communication apparatus is configured to transmit, from the transmission unit, a test packet, in which transmission intervals between the plurality of synchronization symbols are set different from each other in a single communication frame, wherein the second communication apparatus is configured: to perform processing for detecting a synchronization timing with the received test packet; to add period information relevant to a detected period of the synchronization timing into a return signal; and to return the return signal, and wherein the disturbing wave detection part of the first communication apparatus is configured to determine that the detected period of the synchronization timing in the second frequency is integer multiple of the period of the disturbing wave in which the frequency conversion into the second frequency has been performed, based on the period information added into the return signal.

In the present invention, preferably, the disturbing wave detection part of the first communication apparatus is configured to transmit, from the transmission unit, a test packet, in which transmission intervals between the plurality of synchronization symbols are set different from each other in a single communication frame, wherein the second communication apparatus is configured: to perform processing for detecting a synchronization timing with the received test packet; to add period information relevant to a detected period of the synchronization timing into a return signal; and to return the return signal with the detected period of the synchronization timing, and wherein the disturbing wave detection part of the first communication apparatus is configured to determine, when a received period of the return signal in the second frequency is coincident with the period information added into the return signal, that the received period of the return signal in the second frequency is integer multiple of the period of the disturbing wave in which the frequency conversion into the second frequency has been performed.

In the present invention, preferably, the second communication apparatus is configured to detect, as the synchronization timing, a timing in which a difference between the correlation values is equal to or less than a difference threshold, from among a plurality of timings in which the correlation value between the received communication data and the reference signal is equal to or more than a lower limit threshold.

In the present invention, preferably, the second communication apparatus is configured to detect the synchronization timing, when the correlation value between the received communication data and the reference signal is equal to or more than a correlation threshold.

In the present invention, preferably, the disturbing wave detection part is configured to again detect information relevant to the period of the disturbing wave, in a case where, after the communication control part has set the transmission period of the synchronization symbol in the second frequency included in the communication data to be integer multiple of the period of the detected disturbing wave, an incommunicable state has continued between the first and second communication apparatuses during a predetermined time or more.

In the present invention, preferably, the disturbing wave detection part is configured: to transmit, in the case where again detecting the information relevant to the period of the disturbing wave, from the transmission unit, a test packet in which the transmission period of the synchronization symbol in the second frequency has been set to be integer multiple of the period of the previous detected disturbing wave; to detect, when receiving a return signal which is returned by the second communication apparatus, which has received the test packet, upon detecting the synchronization timing, information relevant to the period of the disturbing wave in which the frequency conversion into the second frequency has been performed, based on the return signal; and to transmit, when not receiving the return signal from the second communication apparatus, from the transmission unit, a test packet in which the transmission period of the synchronization symbol has been changed.

In the present invention, preferably, the communication control part is configured to set a transmission period of a symbol, in the second frequency, other than the synchronization symbol in the communication data to be integer multiple of the period of the detected disturbing wave.

A communication method of the present invention, in which a first communication apparatus is configured to perform frequency conversion of communication data, which includes a plurality of known synchronization symbols subjected to spread modulation with a spread code, into a first frequency, and to transmit the communication data, and a second communication apparatus that has received the communication data is configured to perform frequency conversion of the received communication data into a second frequency, and then to perform processing for detecting a synchronization timing, based on a correlation value between the communication data and a reference signal that includes the synchronization symbol, wherein the first communication apparatus comprises the steps of: detecting information relevant to a period of a disturbing wave in which the frequency conversion into the second frequency has been performed; and transmitting the communication data in which a transmission period of the synchronization symbol in the second frequency has been set to be integer multiple of the period of the detected disturbing wave.

In this communication method, it is possible to prevent influence by a disturbing wave with a periodicity and establish correct synchronization in an initial synchronization acquisition.

BRIEF DESCRIPTION OF THE DRAWINGS

Preferred embodiments of the invention will now be described in further details. Other features and advantages of the present invention will become better understood with regard to the following detailed description and accompanying drawings where:

FIG. 7 is a table illustrating a data structure of an interpolation symbol, in which the number of chips is "4", according to the First Embodiment;

FIG. 9 is a table illustrating a data structure of an interpolation symbol, in which the number of chips is "3", according to the First Embodiment;

FIG. 10 is a graph illustrating a correlation pattern for each interpolation symbol according to the First Embodiment;

FIG. 11A is a table illustrating a priority of a test packet according to the First Embodiment;

FIG. 11B is a table illustrating a priority of a test packet according to the First Embodiment;

BEST MODE FOR CARRYING OUT THE INVENTION

Hereinafter, Embodiments of the present invention will be explained, referring to Figures.

First Embodiment

Figure 1A:
FIG. 1A is a block diagram illustrating a configuration of a communication system according to First Embodiment.
Figure 1B:
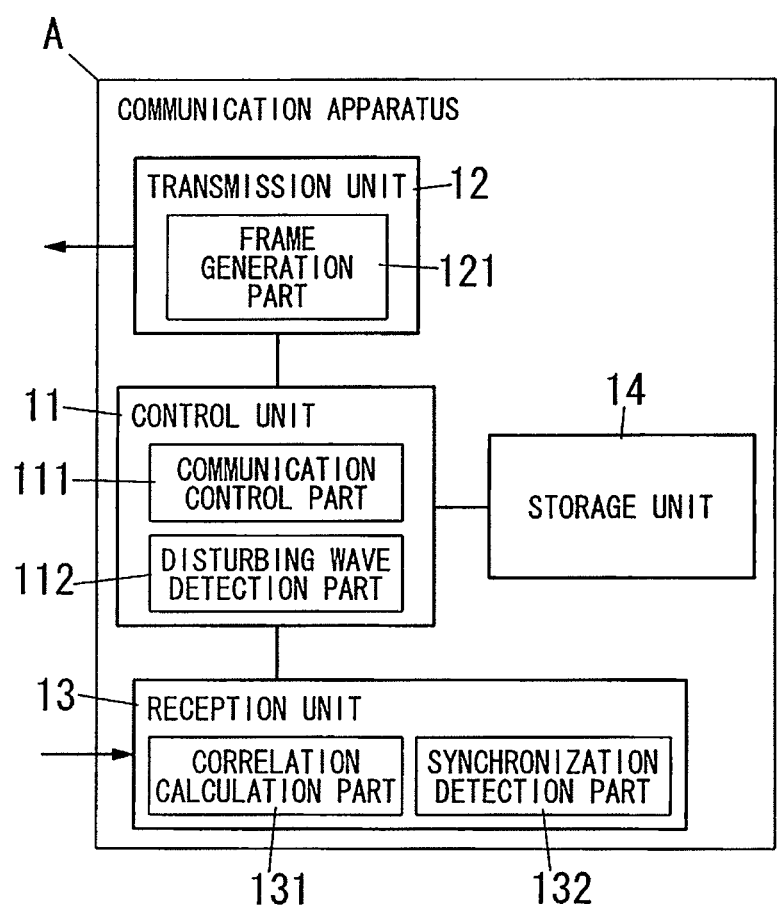
FIG. 1B is a block diagram illustrating a configuration of a communication system according to the First Embodiment.

As shown in FIGS. 1A and 1B, a communication system of the present embodiment includes a plurality of communication apparatuses A (shown as communication apparatuses A1 and A2 in FIG. 1A) that communicate with each other. A communication apparatus A includes a control unit 11, a transmission unit 12, a reception unit 13 and a storage unit 14.

The control unit 11 monitors and controls operation of each unit in the communication apparatus A, and includes a communication control part 111 and a disturbing wave detection part 112. The storage unit 14 stores information relevant to a communication frame, a synchronization symbol, an interpolation symbol, a test packet and the like, as described below.

The transmission unit 12 includes a frame generation part 121. The frame generation part 121 performs the digital modulation of transmission information, and then multiplies a spread code for each symbol of the modulation signal, thereby generating communication data DT in which the modulation signal has been spread. Then, the transmission unit 12 transmits, through an antenna (not shown), the communication data DT in which that an intermediate frequency (a second frequency) has been converted into a RF (Radio Frequency) (a first frequency) by a mixer (not shown).

Figure 2:
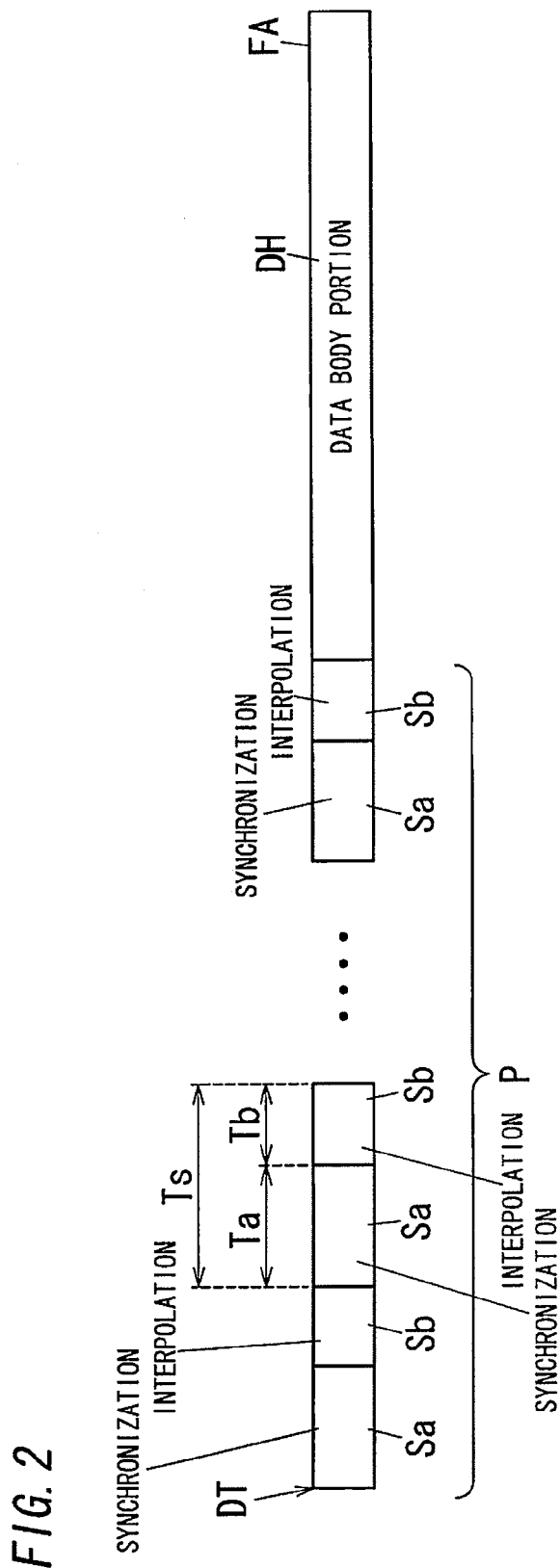
FIG. 2 is a frame structure diagram illustrating communication data according to the First Embodiment.

The communication data DT subjected to spread modulation has a configuration of a communication frame FA as shown in FIG. 2, and is formed by storing data of a preamble and a data body in the communication frame FA, as described below. The communication frame FA includes a preamble portion P and a data body portion DH. The preamble portion P includes a plurality of sets, each of which is constituted by a synchronization symbol Sa and an interpolation symbol Sb, and further also includes the other control signals. Here, because things intimately relating to the present invention are the synchronization symbol Sa and the interpolation symbol Sb, explanations of the other control signals will be omitted below.

The synchronization symbol Sa is obtained by performing spread modulation of a known symbol (e.g., "0000") with a spread code that is previously made to correspond to said known symbol. Similarly, a symbol that constitutes the data body portion DH is also obtained by performing spread modulation with a spread code that is previously made to correspond to each symbol. Hereinafter, the spread code for the spread modulation of the synchronization symbol Sa is called a spread code Ca. The spread code Ca is constituted by 16 chips. The synchronization symbol Sa is subjected to spread modulation as a spread symbol in which the number of chips is "16" (a spreading factor is 4). The symbol length thereof before the spread modulation is 4 bits. In regard to the number of chips, "16" is one example, and the number of chips other than "16" can be also adopted.

The reception unit 13 includes a correlation calculation part 131 and a synchronization detection part 132, and converts the communication data DT, received through the antenna (not shown), into the intermediate frequency (the second frequency) through the mixer (not shown). The correlation calculation part 131 calculates a correlation value between the communication data DT converted into the intermediate frequency and the reference signal. The synchronization detection part 132 detects, as a synchronization timing for the communication data DT, an occurrence timing of a correlation peak value that periodically occurs. Here, the reference signal is a signal obtained by performing spread modulation of a known symbol (e.g., "0000") with a spread code that is previously made to correspond to said known symbol. That is, the reference signal is the synchronization symbol Sa.

Figure 3:
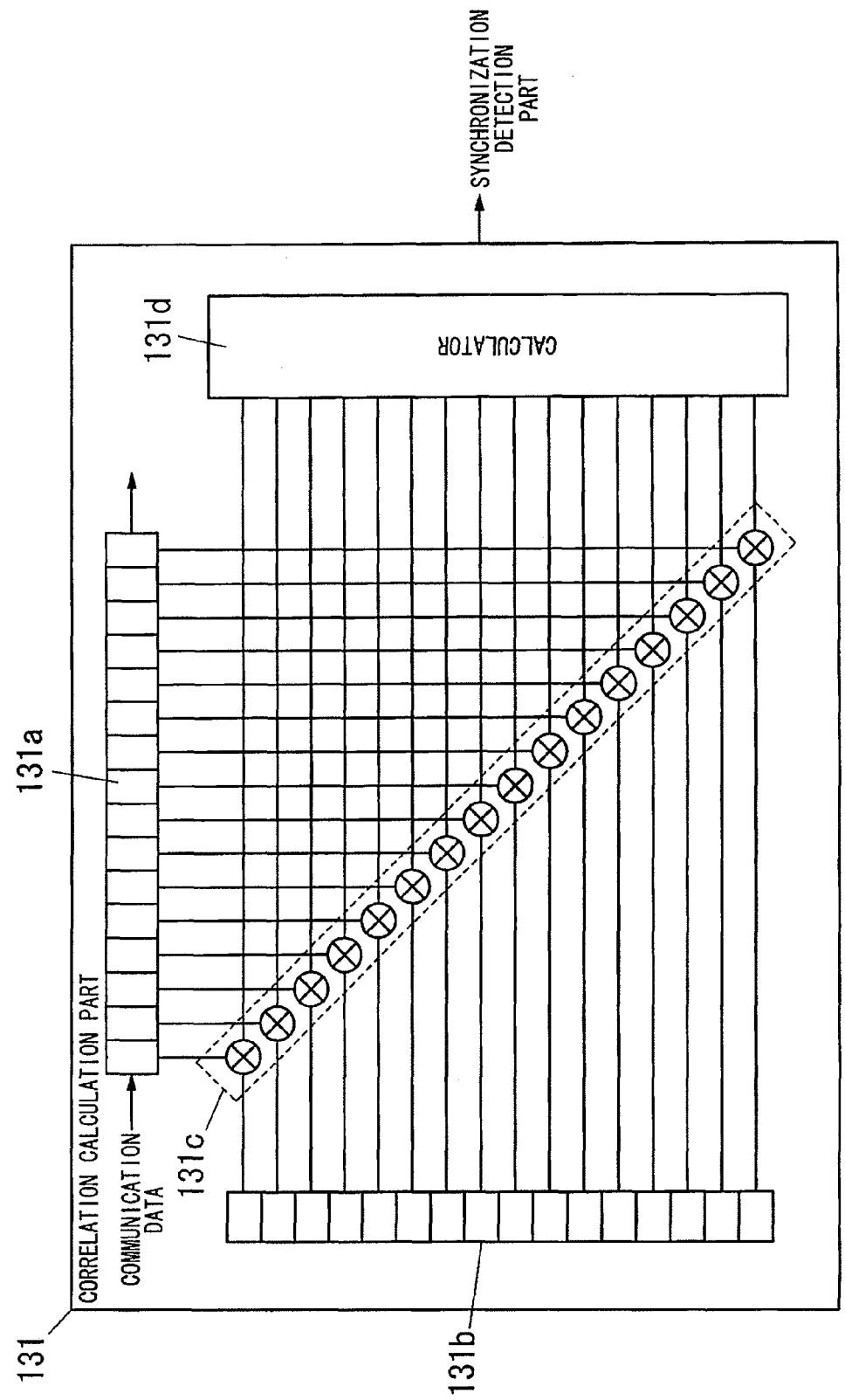
FIG. 3 is a block diagram illustrating a configuration of a correlation calculation part according to the First Embodiment.

Specifically, the correlation calculation part 131 of the reception unit 13 includes a matched filter as shown in FIG. 3, and samples the received communication data DT. The sampled communication data DT is sequentially stored, along a time series, in a shift register 131a that has 16 storage areas, and therefore, a reception sequence of the communication data DT is stored in the shift register 131a. The sampling period is set as a period when data for each chip of the communication data DT is sequentially stored in the storage areas of the shift register 131a, and is configured to be capable of sampling the data for each chip of the communication data DT subjected to spread modulation. The shift register 131a shifts the already stored data to the subsequent area whenever new sampling data is stored.

Further, a reference signal register 131b has 16 storage areas, and stores a code series of the reference signal.

A multiplier 131c multiplies data stored in each storage area of the shift register 131a by data stored in the storage area of the reference signal register 131b that corresponds to the storage area of the shift register 131a. A calculator 131d calculates, as a correlation value between the reception sequence of the communication data DT and the code series of the reference signal, a result obtained by summing 16 multiplication values calculated by the multiplier 131c. Here, the multiplier 131c performs multiplication processing so that bits of "1" and "0" are respectively replaced with as bits of "1" and "−1".

Figure 4:
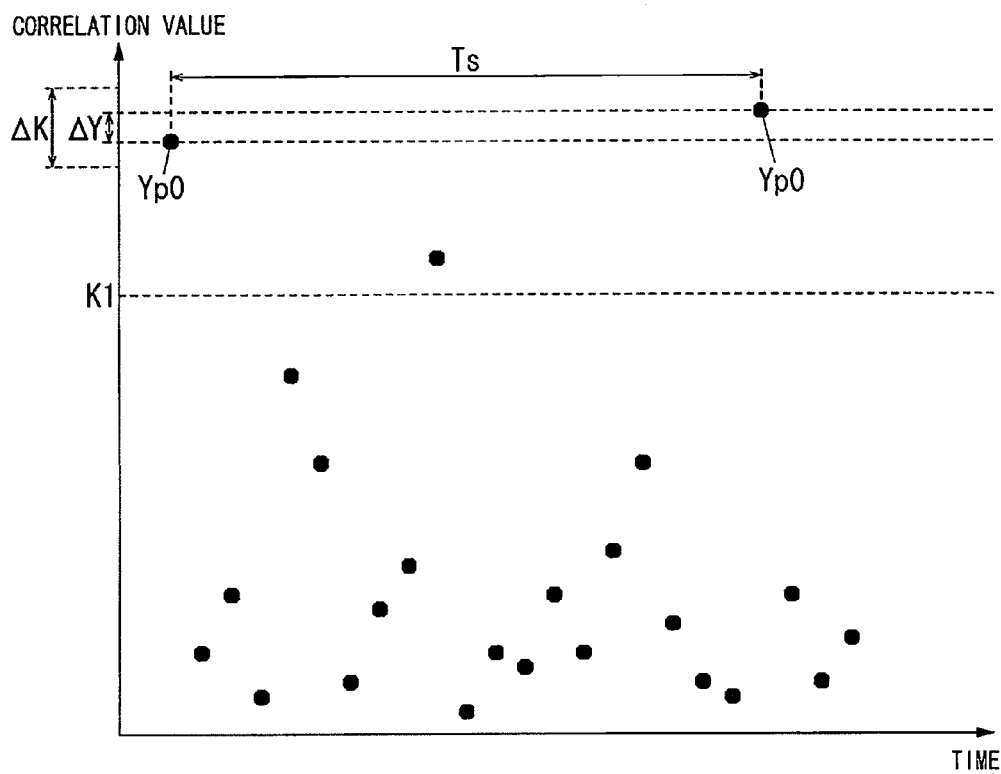
FIG. 4 is a plan view illustrating a correlation pattern according to the First Embodiment.

The synchronization detection part 132 detects the synchronization timing, based on the correlation value that has been calculated by the calculator 131d. As shown in FIG. 4, in the synchronization detection part 132, correlation values arranged along a time series are represented as a correlation pattern. In the correlation pattern, the correlation value reaches a peak (a correlation peak value), when a starting point of the synchronization symbol Sa in the reception sequence is coincident with a starting point of the reference signal in the shift register 131a and the reference signal register 131b.

In the case of a transmission period Ts of the synchronization symbol Sa for example, as shown in FIG. 4, a correlation peak value Yp0 appears for each transmission period Ts (here, the transmission period Ts denotes a transmission period of the synchronization symbol Sa in which the Radio Frequency has been converted into the intermediate frequency). In this case, the synchronization detection part 132 sets a lower limit threshold K1, and extracts correlation values that are equal to or more than the lower limit threshold K1. Then, the synchronization detection part extracts, as a correlation peak value Yp0, each of a plurality of correlation values in which differences ΔY between the plurality of correlation values are equal to or less than a predetermined difference threshold ΔK, among from the correlation values that are equal to or more than the lower limit threshold K1. Then, the synchronization detection part detects, as the synchronization timing, an occurrence timing of the correlation peak value Yp0.

The synchronization detection part may extract, as a correlation peak value Yp0, each of two correlation values or more that are arranged at time intervals corresponding to transmission intervals capable of setting the synchronization symbol Sa, among from the plurality of correlation values in which the differences ΔY between the plurality of correlation values are equal to or less than the predetermined difference threshold ΔK. In this case, detection accuracy of the correlation peak value is further improved.

Preferably, a condition for detecting the synchronization timing is that differences between three correlation peak values or more continuously arranged at a prescribed period (in this case, the transmission period Ts of the synchronization symbol Sa) are equal to or less than the predetermined difference threshold ΔK. In principle, it is desirable that differences between two correlation peak values or more be equal to or less than the predetermined difference threshold ΔK.

Then, the reception unit 13 inversely spreads the communication data DT, through multiplying the received communication data DT by the spread code, in synchronization with the detected synchronization timing, thereby generating a modulation signal in which the communication data DT is inversely spread. Then, the reception unit demodulates information from the modulation signal (digital demodulation).

The frame generation part 121 may generate the communication data DT through performing mapping to replace by the spread code for each symbol of the modulation signal. In this case, the reception unit 13 performs demodulation processing through demapping.

As seen above, in the communication between the communication apparatuses A, resistances to noises and interference are enhanced through performing spread and inverse spread with the spread code. In this spread communication method, a modulation signal having a narrow band is spread to a band wider than the narrow band of the original signal, with a signal that is called a spread code, and is then transmitted, and the signal is restored to the original modulation signal with the same spread code by a receiver side. That is, the band of the modulation signal included in the received signal is restored to the original narrow band in the inverse spread processing performed through multiplying by the spread code, and on the contrary, the noises included in the received signal are spread to a wider band. Therefore, a signal-to-noise power ratio is improved, and it is possible to enhance the resistances to noises and interference.

As one standard of IEEE 802.15.4, there is a direct spread (DDSS) system in which OQPSK is adopted as the modulation system. The transmission unit 12 and reception unit 13 transmit or receive data, using OQPSK. Here, OQPSK is an abbreviation for Offset Quadrature Phase Shift Keying.

The transmission unit 12 and reception unit 13 may be configured to be capable of switching a plurality of modulation systems, to switchably set to any one of the plurality of modulation systems, and to transmit or receive data, using the set modulation system. For example, any one of BPSK, QPSK, 16QAM, 64QAM and 256QAM is selected. BPSK is an abbreviation for Binary Phase Shift Keying, QPSK is an abbreviation for Quadrature Phase Shift Keying, and QAM is an abbreviation for Quadrature Amplitude Modulation.

According to the Radio Act, input and output of the communication apparatuses A are generally subjected to filter processing. Thus, preferably, the code series of the reference signal is set by considering that the reception sequence is influenced by noises, attenuation and the like during the filter processing.

Here, the correlation value between the reception sequence and the code series of the reference signal is calculated by considering both of the real component and the imaginary component of the correlation value, and therefore, calculation accuracy is improved.

Specifically, when the transmitted signal is denoted by "$I_{ref}+jQ_{ref}$", the received signal is denoted by "$I+jQ$" and the reference signal is denoted by "$I_{ref}-jQ_{ref}$", the correlation value is represented by the following formula.

$$\text{The correlation value} = |(I+jQ)^*(I_{ref}-jQ_{ref})| = |(I^*I_{ref}+Q^*Q_{ref})+j(Q^*I_{ref}-Q_{ref}^*I)|$$

The above-mentioned correlation value is obtained by considering the real component and the imaginary component, and the calculation accuracy of the correlation value is improved, compared with a correlation value=$|(I^*I_{ref}+Q^*Q_{ref})|$ obtained by considering only the real component.

Here, in a case where a disturbing wave with a periodicity is present, waviness may occur, in which the correlation peak value also fluctuates in response to fluctuation in signal intensity of the disturbing wave, and therefore, there is a case where it is impossible to detect the correlation peak value. In this case, it is impossible to establish correct synchronization.

Therefore, the present communication system, as shown in the communication frame FA of FIG. 2, is set coincident with the transmission period Ts of the synchronization symbol Sa to integer multiple of the period of the disturbing wave, through adding, to the synchronization symbol Sa, an interpolation symbol Sb of which a symbol length is variable. That is, the present system sets the transmission period Ts of the synchronization symbol Sa in the intermediate frequency so as to be coincident with integer multiple of the period of the disturbing wave in which the frequency conversion into the intermediate frequency has been performed by the reception unit 13. Hereinafter, "setting the transmission period Ts of the synchronization symbol Sa so as to be coincident with integer multiple of the period of the disturbing wave" means "setting the transmission period Ts of the synchronization symbol Sa in the intermediate frequency so as to be coincident with integer multiple of the period of the disturbing wave in which the frequency conversion into the intermediate frequency has been performed", as described above.

Accordingly, it is possible to equalize the influence of the disturbing wave on each of all synchronization symbols Sa included in the communication data DT, and it is possible to substantively equalize a width by which the correlation peak value generated by the synchronization symbol Sa is fluctuated due to the disturbing wave. Therefore, because it is possible to prevent variation in the correlation peak values upon the reception of the communication data DT, it is possible to prevent influences by the disturbing wave having a periodicity, and to establish correct synchronization in the initial synchronization acquisition of the communication data DT.

In the present invention, "setting the transmission period Ts of the synchronization symbol Sa so as to be coincident with integer multiple of the period of the disturbing wave" includes a state where the transmission period Ts of the synchronization symbol Sa is substantively coincident with integer multiple of the period of the disturbing wave within a range capable of providing the above-mentioned effect.

Hereinafter, processing for setting the interpolation symbol Sb will be explained. Here, the communication apparatus (a first communication apparatus) A1 in FIG. 1A functions as a transmitter side, and the communication apparatus (a second communication apparatus) A2 functions as a receiver side. As described above, the communication apparatus (first communication apparatus) A1 and the communication apparatus (second communication apparatus) A2 have the same configurations. Therefore, the communication apparatus (second communication apparatus) A2 can also function as a transmitter side, and the communication apparatus (first communication apparatus) A1 can also function as a receiver side.

Figure 5A:
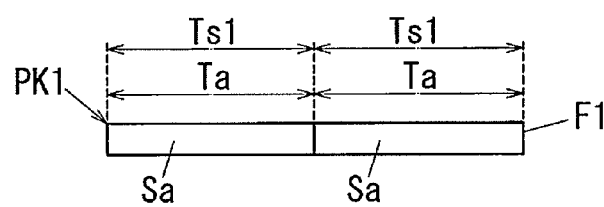
FIG. 5A is a frame structure diagram illustrating a test packet according to the First Embodiment.
Figure 5B:
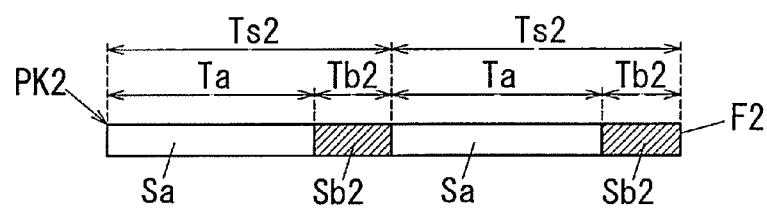
FIG. 5B is a frame structure diagram illustrating a test packet according to the First Embodiment.
Figure 5C:
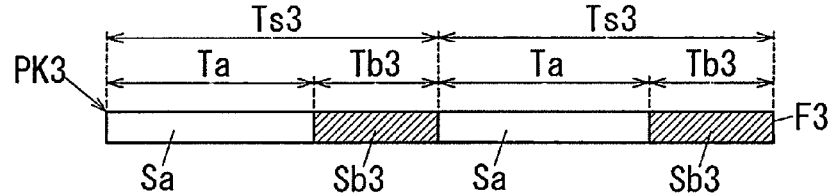
FIG. 5C is a frame structure diagram illustrating a test packet according to the First Embodiment.

First, as shown in FIGS. 5A to 5C, the disturbing wave detection part 112 of the communication apparatus (first communication apparatus) A1 sequentially transmits, from the transmission unit 12, test packets PK (PK1, PK2, PK3 . . . ), in which the transmission period Ts of the synchronization symbol Sa has been fluctuated, using the communication frames (F1, F2, F3 . . . ), respectively. The synchronization symbols Sa of the communication frames (F1, F2, F3 . . . ) have equal symbol lengths Ta (the number of chips), and the interpolation symbols Sb of the communication frames (F1, F2, F3 . . . ) have different symbol lengths Tb (the number of chips). The transmission periods Ts of the synchronization symbols Sa, the symbol lengths Ta of the synchronization symbols Sa and the symbol lengths Tb of the interpolation symbols Sb are values of the test packets PK in the intermediate frequency.

For example, the test packet PK1 shown in FIG. 5A includes the communication frame F1 in which only a synchronization symbol Sa is continuously arranged a plurality of times. The number of chips of the synchronization symbol is "16". In this case, when the symbol length of the synchronization symbol Sa is denoted by "Ta", the transmission period Ts1 of the synchronization symbol Sa is equal to "Ta".

The test packet PK2 shown in FIG. 5B includes the communication frame F2 in which a set of a synchronization symbol Sa and an interpolation symbol Sb2 is continuously arranged a plurality of times. The number of chips of the synchronization symbol is "16", and the number of chips of the interpolation symbol is "3". In this case, when the symbol length of the synchronization symbol Sa is denoted by "Ta" and the symbol length of the interpolation symbol Sb2 is denoted by "Tb2", the transmission period Ts2 of the synchronization symbol Sa is equal to "Ta+Tb2".

The test packet PK3 shown in FIG. 5C includes the communication frame F3 in which a set of a synchronization symbol Sa and an interpolation symbol Sb3 is continuously arranged a plurality of times. The number of chips of the synchronization symbol is "16", and the number of chips of the interpolation symbol is "4". In this case, when the symbol length of the synchronization symbol Sa is denoted by "Ta" and the symbol length of the interpolation symbol Sb3 is denoted by "Tb3", the transmission period Ts3 of the synchronization symbol Sa is equal to "Ta+Tb3".

That is, the disturbing wave detection part 112 of the communication apparatus (first communication apparatus) A1 adopts a test packet PK in which transmission intervals between the plurality of synchronization symbols Sa are set constant in a single communication frame. Further, the disturbing wave detection part transmits the test packet PK sequentially selected from among a plurality of test packets PK. The transmission intervals between the plurality of synchronization symbols Sa in each of the plurality of test packets PK are different from the transmission intervals between the plurality of synchronization symbols Sa in the other test packets PK. The number of chips of the interpolation symbol Sb in each of the test packets PK is not limited to the above-mentioned number of chips, and is capable of being arbitrarily set.

In the communication apparatus (second communication apparatus) A2 that has received the test packets PK (PK1, PK2, PK3 . . . ), the correlation calculation part 131 of the reception unit 13 calculates a correlation value between the test packet PK, in which the Radio Frequency has been converted into the intermediate frequency, and the reference signal. Then, the synchronization detection part 132 detects the occurrence timing (the synchronization timing) of the correlation peak value, and then the communication control part 111 returns an ACK signal with the occurrence timing of the correlation peak value. Here, in a case where a disturbing wave with a periodicity is present, waviness may occur, in which the correlation peak value also fluctuates in response to fluctuation in signal intensity of the disturbing wave, and therefore, there is a case where it is impossible to detect the correlation peak value. The ACK signal is equivalent to a return signal in the invention.

For example, assuming that the integer multiple of the period of the disturbing wave is coincident with the transmission period Ts3 of the synchronization symbol Sa, processing for detecting the period of the disturbing wave will be explained, using the sequence diagram of FIG. 6. In the processing, the test packets (PK1, PK2, PK3 . . . ) are utilized.

First, the disturbing wave detection part 112 of the communication apparatus (first communication apparatus) A1 transmits the test packet PK1 (X1). However, because the transmission period Ts1 of the synchronization symbol Sa is not coincident with the integer multiple of the period of the disturbing wave, waviness occurs in the synchronization detection part 132 of the communication apparatus (second communication apparatus) A2. In the waviness, the correlation peak value also fluctuates in response to fluctuation in signal intensity of the disturbing wave. Therefore, because a difference between the correlation peak values is out of the predetermined difference threshold ΔK, the synchronization detection part 132 of the communication apparatus (second communication apparatus) A2 cannot detect the correlation peak value, and accordingly the ACK signal is not returned from the communication apparatus (second communication apparatus) A2.

Then, in a case where the ACK signal is not returned from the communication apparatus (second communication apparatus) A2 until a predetermined time Td elapses after transmission of the test packet PK1, the disturbing wave detection part 112 of the communication apparatus (first communication apparatus) A1 transmits the test packet PK2 (X2). However, because the transmission period Ts2 of the synchronization symbol Sa is not coincident with the integer multiple of the period of the disturbing wave, waviness occurs in the synchronization detection part 132 of the communication apparatus (second communication apparatus) A2. In the waviness, the correlation peak value also fluctuates in response to fluctuation in signal intensity of the disturbing wave. Therefore, because a difference between the correlation peak values is out of the predetermined difference threshold ΔK, the synchronization detection part 132 of the communication apparatus (second communication apparatus) A2 cannot detect the correlation peak value, and accordingly the ACK signal is not returned from the communication apparatus (second communication apparatus) A2.

Then, in a case where the ACK signal is not returned from the communication apparatus (second communication apparatus) A2 until the predetermined time Td elapses after transmission of the test packet PK2, the disturbing wave detection part 112 of the communication apparatus (first communication apparatus) A1 transmits the test packet PK3 (X3). In this case, the transmission period Ts3 of the synchronization symbol Sa is coincident with the integer multiple of the period of the disturbing wave. Therefore, because differences between the plurality of correlation peak values are equal to or less than the predetermined difference threshold ΔK, the synchronization detection part 132 of the communication apparatus (second communication apparatus) A2 can detect the correlation peak value. In this case, the ACK signal is returned from the communication apparatus (second communication apparatus) A2 (X4).

Because the disturbing wave detection part 112 of the communication apparatus (first communication apparatus) A1 has received the ACK signal from the communication apparatus (second communication apparatus) A2 until the predetermined time Td elapses after transmission of the test packet PK3, the disturbing wave detection part 112 stops processing for transmitting subsequent test packet PK. Then, the disturbing wave detection part 112 determines that the transmission period Ts3 of the synchronization symbol Sa included in the test packet PK3 is coincident with the integer multiple of the period of the disturbing wave (X5).

Subsequently, the communication control part 111 of the communication apparatus (first communication apparatus) A1 transmits the communication data DT including the preamble portion P that is configured by the synchronization symbols Sa and the interpolation symbols Sb3. In this case, the number of chips of each synchronization symbol Sa is "16" and the number of chips of each interpolation symbol Sb3 is "4". Therefore, it is possible to set the transmission period of the synchronization symbol Sa included in the communication data DT so as to be coincident with the integer multiple of the period of the disturbing wave (X6).

Next, the data structure of the interpolation symbol Sb will be explained. With respect to the interpolation symbol Sb, it is desirable that a correlation value between a reception sequence including at least a part of the interpolation symbol Sb and the reference signal be low. In a case where the number of chips of the interpolation symbol Sb3 is "4", 16 patterns of data structures are considered as shown in FIG. 7. The interpolation symbol Sb3 used in the present embodiment has any of the data structures in which the correlation value between the reception sequence including at least the part of the interpolation symbol Sb3 and the reference signal is the lowest.

Figure 8:
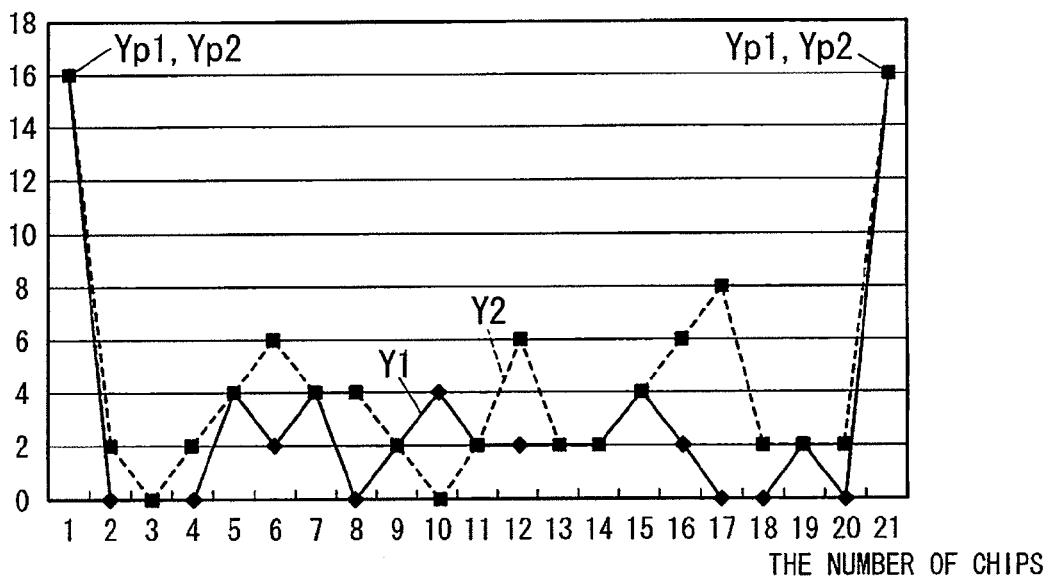
FIG. 8 is a graph illustrating a correlation pattern for each interpolation symbol according to the First Embodiment.

In the 16 patterns of the interpolation symbols Sb3 shown in FIG. 7, it is assumed that a correlation value between a reception sequence and the reference signal in Pattern 4 of data structure "0011" is the lowest, and a correlation value between a reception sequence and the reference signal in Pattern 13 of data structure "1100" is the highest. FIG. 8 shows two correlation patterns between preamble portions P using those two types of the interpolation symbols Sb3, and the reference signal. A correlation pattern Y1 indicated by a solid line corresponds to a preamble portion P in which the interpolation symbol Sb3 "0011" is used. A correlation pattern Y2 indicated by a broken line corresponds to a preamble portion P in which the interpolation symbol Sb3 "1100" is used. In this case, a pattern of 16 chips in the reference signal is set as "0011111000100101".

The preamble portion P is configured by the synchronization symbols Sa and the interpolation symbols Sb3. The number of chips of each synchronization symbol Sa is "16" and the number of chips of each interpolation symbol Sb3 is "4". In the correlation patterns Y1 and Y2, the correlation peak values Yp1 and Yp2 are respectively generated for every 20 chips. However, in regard to values other than the correlation peak values, the correlation values in the correlation pattern Y1 are largely lower than those in the correlation pattern Y2. Therefore, through adopting "0011" to the data structure of the interpolation symbol Sb3, it is possible to reduce the possibility of incorrectly determining that the correlation value between the reception sequence including at least the part of the interpolation symbol Sb3 and the reference signal is the correlation peak value.

In a case where the number of chips of the interpolation symbol Sb2 is "3", 8 patterns of data structures are considered as shown in FIG. 9. The interpolation symbol Sb2 used in the present embodiment has any of the data structures in which a correlation value between a reception sequence including at least a part of the interpolation symbol Sb2 and the reference signal is the lowest.

In the 8 patterns of the interpolation symbols Sb2 shown in FIG. 9, it is assumed that a correlation value between a reception sequence and the reference signal in Pattern 2 of data structure "001" is the lowest, and a correlation value between a reception sequence and the reference signal in Pattern 5 of data structure "100" is the highest. FIG. 10 shows two correlation patterns between preamble portions P using those two types of the interpolation symbols Sb2, and the reference signal. A correlation pattern Y11 indicated by a solid line corresponds to a preamble portion P in which the interpolation symbol Sb2 "001" is used. A correlation pattern Y12 indicated by a broken line corresponds to a preamble portion P in which the interpolation symbol Sb2 "100" is used.

The preamble portion P is configured by the synchronization symbols Sa and the interpolation symbols Sb2. The number of chips of each synchronization symbol Sa is "16" and the number of chips of each interpolation symbol Sb3 is "3". In the correlation patterns Y11 and Y12, the correlation peak values Yp11 and Yp12 are respectively generated for every 19 chips. However, in regard to values other than the correlation peak values, the correlation values in the correlation pattern Y11 are largely lower than those in the correlation pattern Y12. Therefore, through adopting "001" to the data structure of the interpolation symbol Sb2, it is possible to reduce the possibility of incorrectly determining that the correlation value between the reception sequence including at least the part of the interpolation symbol Sb2 and the reference signal is the correlation peak value.

In the communication apparatus (first communication apparatus) A1, the control unit 11 sets the transmission period of the synchronization symbol Sa in the communication data DT so as to be coincident with the integer multiple of the period of the disturbing wave, through setting the symbol length of the interpolation symbol Sb as described above, and then monitors a state of communication performed between the communication apparatus (second communication apparatus) A2 and the communication apparatus A1. The disturbing wave detection part 112 of the communication apparatus (first communication apparatus) A1 again performs operation for detecting the period of the disturbing wave, in a case where an incommunicable state has continued between the communication apparatus (second communication apparatus) A2 and the communication apparatus A1 during a predetermined time or more.

The disturbing wave detection part 112 again transmits the test packet PK to again detect the period of the disturbing wave. At this time, the disturbing wave detection part determines the test packet PK again transmitted, referring to a priority table TB1 shown in FIGS. 11A and 11B. In the priority table TB1, the priority orders of the test packets (PK1, PK2, PK3, PK4 . . . ) are set. Here, the transmission periods Ts of the plurality of synchronization symbols Sa in each of the test packets are different from the transmission intervals Ts between the plurality of synchronization symbols Sa in the other test packets.

FIG. 11A shows the priority table TB1 in an initial state, and a higher priority order (Priority order "1" is the highest) is set to the test packet PK in which the transmission periods Ts of the synchronization symbols Sa are shorter. After determining that the integer multiple of the period of the disturbing wave is coincident with the transmission period Ts3 of the synchronization symbol Sa in the test packet PK3 upon a first detection of the disturbing wave, the disturbing wave detection part 112 updates the priority table TB1 as shown in FIG. 11B. In the updated priority table TB1, the priority order of the test packet PK3 is set so as to be the highest. With respect to the other test packets (PK1, PK2, PK4 . . . ), a higher priority order is set to the test packet PK in which the transmission periods Ts of the synchronization symbols Sa are shorter.

In a case of again detecting the period of the disturbing wave, the disturbing wave detection part 112 first transmits the test packet PK3, referring to the updated priority table TB1. In a case where the ACK signal to the test packet PK3 has not been returned, the disturbing wave detection part 112 transmits the other test packets (PK1, PK2, PK4 . . . ) in the order of high priority, referring to the updated priority table TB1. When receiving the ACK signal from the communication apparatus (second communication apparatus) A2, the disturbing wave detection part 112 stops processing for transmitting subsequent test packet PK.

In this way, it is possible to preferentially deal with the disturbing wave which is considered to be frequently generated, through preferentially transmitting the previous test packet PK in which the transmission period of the synchronization symbol has been coincident with the integer multiple of the period of the disturbing wave.

In the above-mentioned explanations, the communication control part 111 of the communication apparatus (first communication apparatus) A1 is configured to set the symbol length Tb of the interpolation symbol Sb so that a sum of the symbol length Ta of the synchronization symbol Sa and the symbol length a % is coincident with the integer multiple of the period of the disturbing wave. Here, alternatively, time periods (the symbol lengths Tb) of the interpolation symbols Sb provided in the communication data DT and the test packet PK may be set as a time period (a transmission operation stop period) for stopping transmission operation of the transmission unit 12. That is, the communication control part 111 of the communication apparatus (first communication apparatus) A1 may be configured to set a time length of the transmission operation stop period so that a sum of the symbol length Ta of the synchronization symbol Sa and the transmission operation stop period is coincident with the integer multiple of the period of the detected disturbing wave. In this case, it is possible to obtain the above-mentioned same effect, through setting the time length of the transmission operation stop period, similarly to the symbol length Tb. Further, because electric power for transmitting the interpolation symbols Sb is not required, it is possible to achieve power saving.

The processing for detecting the disturbing wave may be performed as below.

Figure 6:
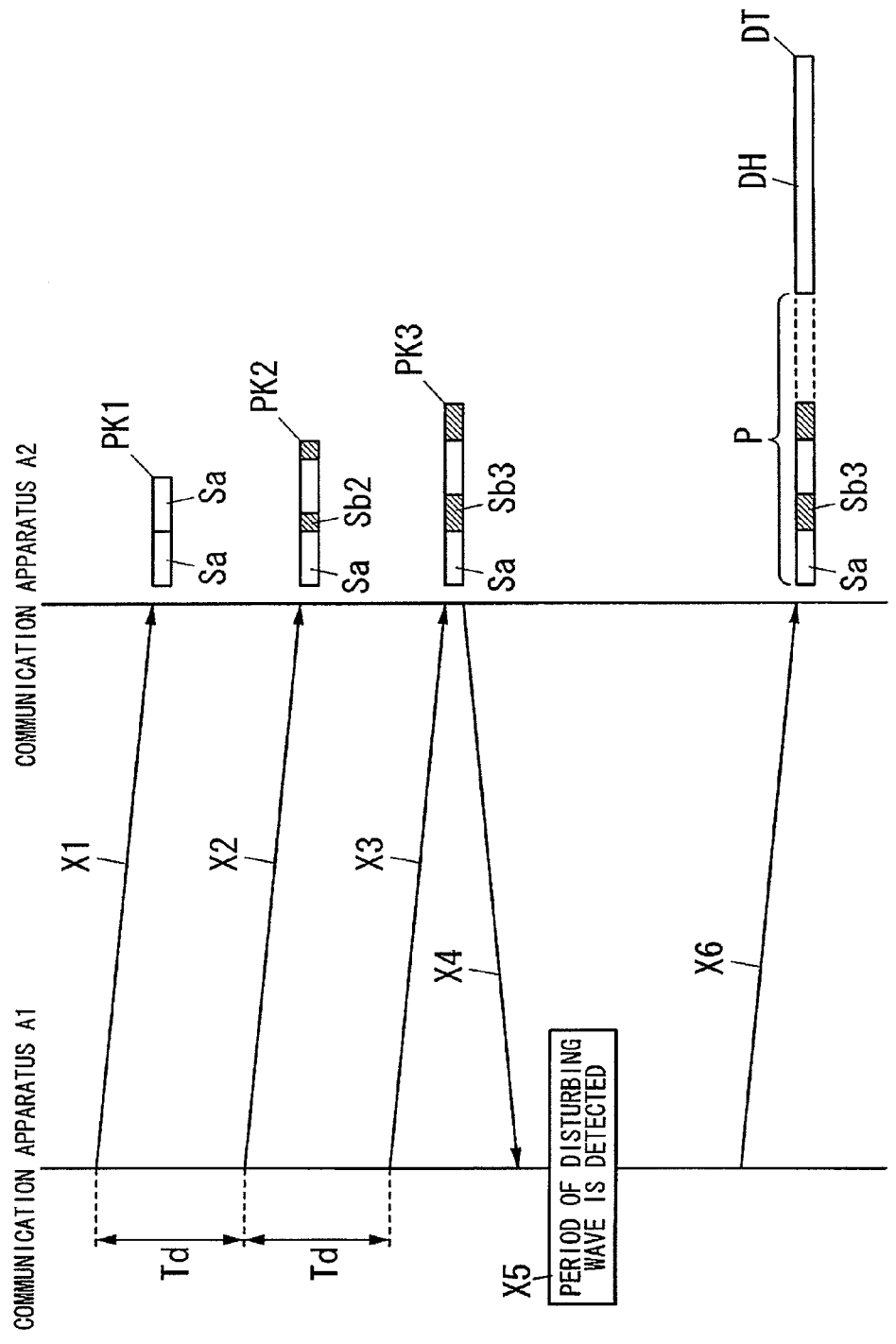
FIG. 6 is a sequence diagram illustrating processing for detecting a period of a disturbing wave according to the First Embodiment.

First, in the sequence of FIG. 6, because the disturbing wave detection part 112 of the communication apparatus (first communication apparatus) A1 has received the ACK signal from the communication apparatus (second communication apparatus) A2 after transmission of the test packet PK3, the disturbing wave detection part stops processing for transmitting subsequent test packet PK. The disturbing wave detection part 112 determines that the transmission period Ts3 of the synchronization symbol Sa included in the test packet PK3 is coincident with the integer multiple of the period of the disturbing wave.

Here, regardless of the presence or absence of return of the ACK signal, the disturbing wave detection part 112 may sequentially transmit all of the test packets PK (PK1, PK2, PK3 . . . ) that use the interpolation symbols Sb having different symbol lengths Tb. In this case, it is considered that there is a plurality of test packets PK in which ACK signals are returned from the communication apparatus (second communication apparatus) A2. Therefore, the communication control part 111 of the communication apparatus (second communication apparatus) A2 adds, into the ACK signal, information (correlation value information) relevant to variation in the correlation peak values resulting from the received test packet PK, and returns the ACK signal.

The communication control part 111 of the communication apparatus (first communication apparatus) A1 that has received the ACK signal selects a test packet PK in which variation in the correlation peak values is the smallest, based on the correlation value information. Subsequently, the communication control part 111 of the communication apparatus (first communication apparatus) A1 adopts, to the preamble portion P in the communication data DT that is transmitted, a set of a synchronization symbol Sa and an interpolation symbols Sb that has been used in this selected test packet PK.

In the present embodiment, the communication apparatus (second communication apparatus) A2 may return the ACK signal with a detected period of the synchronization timing, when receiving the test packet PK. That is, a return period of the ACK signal is equal to the transmission period Ts of the synchronization symbol Sa in the test packet PK. Then, the disturbing wave detection part 112 of the communication apparatus (first communication apparatus) A1 determines that a received period of the ACK signal is coincident with the integer multiple of the period of the disturbing wave.

The communication apparatus (second communication apparatus) A2 may add, to the ACK signal, information (period information) relevant to the detected period of the synchronization timing. Then, the disturbing wave detection part 112 of the communication apparatus (first communication apparatus) A1 determines that the detected period of the synchronization timing is coincident with the integer multiple of the period of the disturbing wave, based on the period information included in the received ACK signal.

When receiving the test packet PK, the communication apparatus (second communication apparatus) A2 may return the ACK signal, into which the period information has been added, with the detected period of the synchronization timing. In this case, the disturbing wave detection part 112 of the communication apparatus (first communication apparatus) A1 determines that the received period of the ACK signal is coincident with the integer multiple of the period of the disturbing wave, in a case where the received period of the ACK signal is coincident with the detected period of the synchronization timing that has been determined based on the period information included in the ACK signal returned from the communication apparatus (second communication apparatus) A2. Thus, detection accuracy of the disturbing wave is improved.

Second Embodiment

A communication system of the present embodiment is different from that of the First Embodiment, in the frame structure of the test packet PK. Therefore, same configuration elements are assigned with same reference numerals, and explanations thereof will be omitted.

Figure 12:
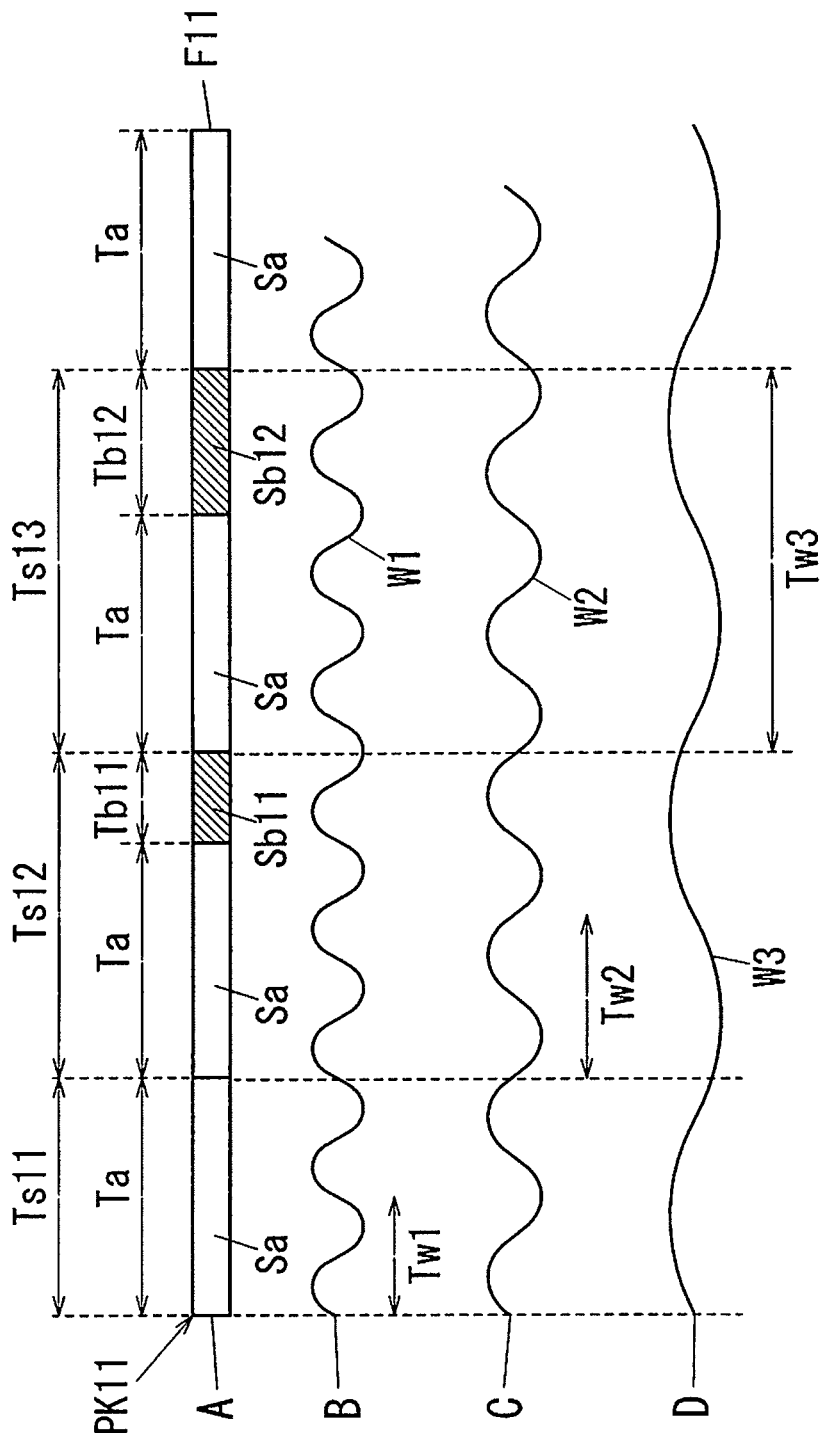
FIG. 12 is a schematic diagram illustrating a relationship between a test packet and a disturbing wave in a communication system according to Second Embodiment.

First, as shown in A of FIG. 12, the disturbing wave detection part 112 of the communication apparatus (first communication apparatus) A1 transmits, from the transmission unit 12, a test packet PK11 in which the transmission period Ts of the synchronization symbol Sa is fluctuated in a single communication frame F11.

For example, in the test packet PK11 shown in the above-mentioned A, a plurality of sets, each of which is a set of a synchronization symbol Sa and an interpolation symbol Sb, are continuously arranged. The number of chips of the synchronization symbol Sa is "16". The first synchronization symbol Sa constitutes a set without an interpolation symbol Sb, and the next synchronization symbol Sa constitutes a set with an interpolation symbol Sb11 in which the number of chips is "1", and the next synchronization symbol Sa constitutes a set with an interpolation symbol Sb12 in which the number of chips is "2". Subsequently, the number of chips of an interpolation symbol Sb with which a synchronization symbol Sa constitutes a set is increased one by one. That is, the transmission period Ts of the synchronization symbol Sa is fluctuated as Ts11, Ts12, Ts13 . . . (Ts11<Ts12<

Ts13< . . . ) in the single communication frame F11. The increment in the number of chips is not limited to "1", and is capable of being arbitrarily set.

Here, the symbol length of the synchronization symbol Sa is denoted by "Ta", the symbol length of the interpolation symbol Sb11 is denoted by "Tb11", the symbol length of the interpolation symbol Sb12 is denoted by "Tb12", and so on. In this case, the transmission period Ts11 of the synchronization symbols Sa is equal to "Ta", the transmission period Ts12 is equal to "Ta+Tb11", the transmission period Ts13 is equal to "Ta+Tb12", and so on.

It is possible to determine the presence or absence of disturbing waves having a plurality of frequencies, through transmitting, one time, the test packet PK11 configured in this way. For example, as shown B to D of FIG. 12, the transmission period Ts11 is coincident with twice the length of a period Tw1 of a disturbing wave W1, the transmission period Ts12 is coincident with twice the length of a period Tw2 of a disturbing wave W2, and the transmission period Ts13 is coincident with twice the length of a period Tw3 of a disturbing wave W3. That is, it is possible to determine the existence of any of a plurality of disturbing waves W1, W2 and W3, through transmitting, one time, the test packet PK11. In B to D of FIG. 12, the periods Tw1 to Tw3 denote periods of the disturbing waves W1 to W3 that has been converted into the intermediate frequency by the reception unit 13, respectively.

In the communication apparatus (second communication apparatus) A2 that has received the test packet PK11, the correlation calculation part 131 of the reception unit 13 calculates a correlation value between the received test packet PK11 and the reference signal. The synchronization detection part 132 then detects a synchronization timing of the test packet PK11 from the correlation peak value.

For example, assuming that the disturbing wave W2 (see FIG. 12) is present, the processing for detecting the period of the disturbing wave will be explained, using a sequence of FIG. 13. In the processing, the test packet PK11 is utilized.

First, the disturbing wave detection part 112 of the communication apparatus (first communication apparatus) A1 transmits the test packet PK11 (X11). In the communication apparatus (second communication apparatus) A2, the correlation calculation part 131 calculates a correlation value between the test packet PK11 and the reference signal, and the synchronization detection part 132 detects the occurrence timing of the correlation peak value, and the communication control part 111 returns the ACK signal with the occurrence timing (the synchronization timing) of the correlation peak value.

Here, waviness occurs in the synchronization detection part 132 of the communication apparatus (second communication apparatus) A2. In the waviness, the correlation peak value also fluctuates in response to fluctuation in signal intensity of the disturbing wave W2. In this case, because the transmission periods Ts11, Ts13 of the synchronization symbols Sa are not coincident with the integer multiple of the period of the disturbing wave, the correlation peak values generated by the synchronization symbols Sa of the transmission periods Ts11, Ts13 fluctuate due to the waviness. As a result, because a difference between the correlation peak values generated by the synchronization symbols Sa of the transmission periods Ts11, Ts13 is out of the predetermined difference threshold $\Delta K$, the synchronization detection part 132 of the communication apparatus (second communication apparatus) A2 cannot detect the correlation peak value. That is, the ACK signal is not returned with timings of the transmission periods Ts11, Ts13 from the communication apparatus (second communication apparatus) A2.

On the other hand, with respect to the correlation peak value generated by the synchronization symbol Sa of the transmission period Ts12, the width thereof that fluctuates due to the disturbing wave W2 becomes substantively uniform. Therefore, the synchronization detection part 132 of the communication apparatus (second communication apparatus) A2 can detect only the correlation peak value generated by the synchronization symbol Sa of the transmission period Ts12, and returns the ACK signal with the detection timing (the synchronization timing) of the correlation peak value. That is, the ACK signal is returned with the transmission period Ts12 from the communication apparatus (second communication apparatus) A2 (X12).

The disturbing wave detection part 112 of the communication apparatus (first communication apparatus) A1 receives the ACK signal returned with the transmission period Ts12, from the communication apparatus (second communication apparatus) A2, and accordingly determines that the transmission period Ts12 is coincident with the integer multiple of the period of the disturbing wave W2 (X13). Subsequently, the communication control part 111 of the communication apparatus (first communication apparatus) A1 transmits the communication data DT including the preamble portion P that is configured by the synchronization symbols Sa and the interpolation symbols Sb11. In this case, the number of chips of each synchronization symbol Sa is "16" and the number of chips of each interpolation symbol Sb11 is "1". Therefore, it is possible to set the transmission period of the synchronization symbol Sa included in the communication data DT so as to be coincident with the integer multiple of the period of the disturbing wave (X14).

Accordingly, it is possible to equalize the influence of the disturbing wave on each of all synchronization symbols Sa included in the communication data DT, and it is possible to substantively equalize a width by which the correlation peak value generated by the synchronization symbol Sa is fluctuated due to the disturbing wave. Therefore, because it is possible to prevent variation in the correlation peak values upon the reception of the communication data DT, it is possible to prevent influences by the disturbing wave having a periodicity, and to establish correct synchronization in the initial synchronization acquisition of the communication data DT.

In a case where the ACK signal response to the test packet PK11 has not been returned, the test packet PK11 is transmitted to perform the above processing again.

Here, alternatively, in a case where the ACK signal response to the test packet PK11 has not been returned, another test packet in which the transmission period Ts of the synchronization symbol Sa is fluctuated in a single communication frame may be transmitted to perform the above processing again.

In the present embodiment, a time period (the symbol length Tb) of the interpolation symbol Sb provided in the communication data DT and the test packet PK may be set as a time period (a transmission operation stop period) for stopping transmission operation of the transmission unit 12. In this case, it is possible to obtain the above-mentioned same effect, through setting the time length of the transmission operation stop period, similarly to the symbol length Tb. Further, because electric power for transmitting the interpolation symbols Sb is not required, it is possible to achieve power saving.

The processing for detecting the disturbing wave may be performed as below.

Figure 13:
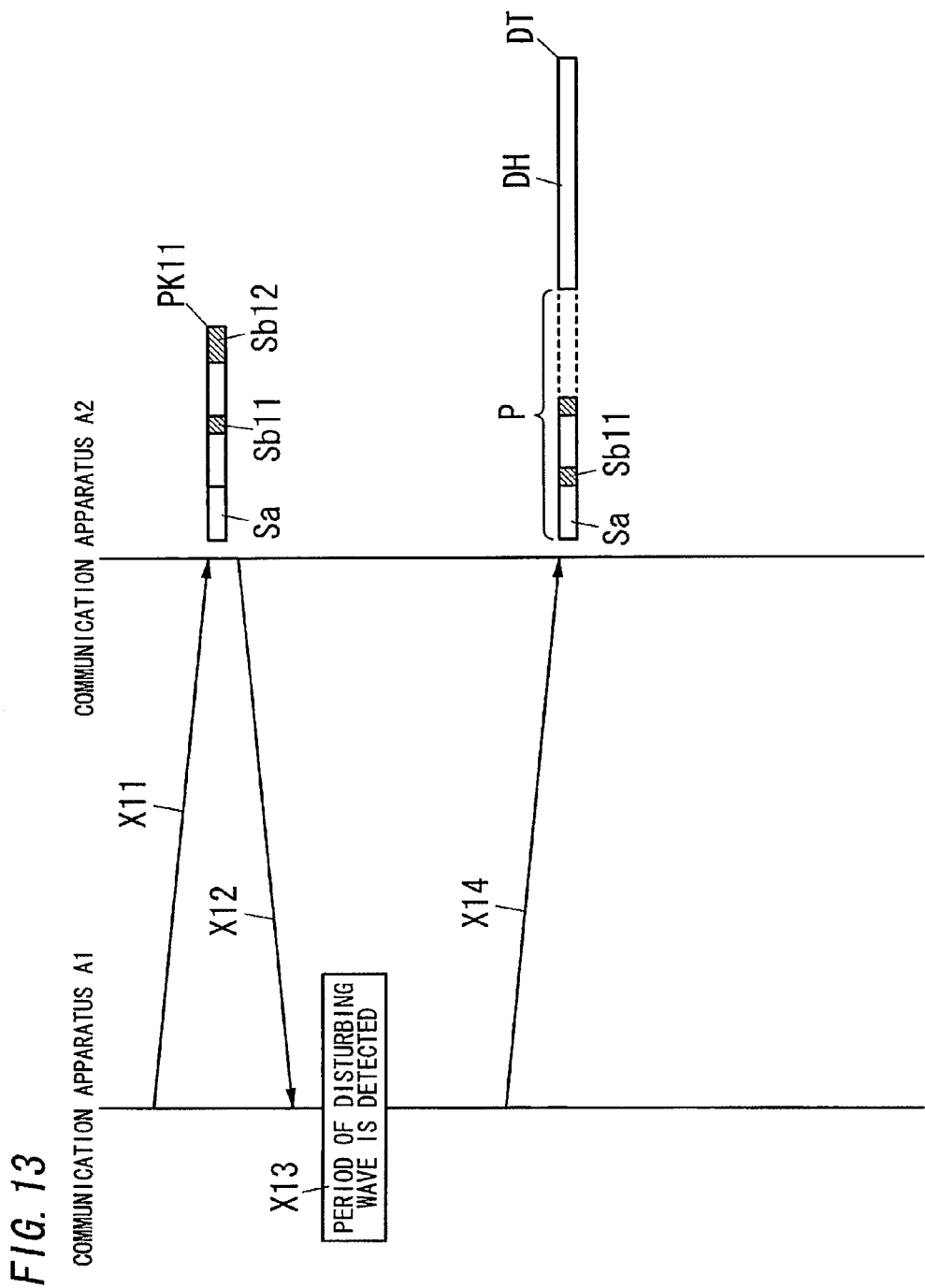
FIG. 13 is a sequence diagram illustrating processing for detecting a period of a disturbing wave according to the Second Embodiment.

First, in the sequence of FIG. 13, the disturbing wave detection part 112 of the communication apparatus (first communication apparatus) A1 determines that the integer multiple of the period of the disturbing wave is coincident with the received period Ts12 of the ACK signal received from the communication apparatus (second communication apparatus) A2 after transmission of the test packet PK11.

The communication control part 111 of the communication apparatus (second communication apparatus) A2 may add, to the ACK signal, information (period information) relevant to the detected period (Ts12) of the synchronization timing. In this case, the disturbing wave detection part 112 of the communication apparatus (first communication apparatus) A1 that has received the ACK signal determines that the period Ts12 based on the period information is coincident with the integer multiple of the period of the disturbing wave.

The disturbing wave detection part 112 of the communication apparatus (first communication apparatus) A1 may determine that the received period of the ACK signal is coincident with the integer multiple of the period of the disturbing wave, in a case where the received period of the ACK signal is coincident with the detected period of the synchronization timing that has been determined based on the period information included in the ACK signal from the communication apparatus (second communication apparatus) A2. In this case, detection accuracy of the disturbing wave is improved.

Because the other configuration elements are similar to those of the First Embodiment, explanations thereof are omitted.

Third Embodiment

A communication system of the present embodiment is different from the communication systems of the First and Second Embodiments, in the processing for detecting the synchronization timing performed by the synchronization detection part 132, and accordingly, same configuration elements are assigned with same reference numerals, and explanations thereof will be omitted.

Figure 14:
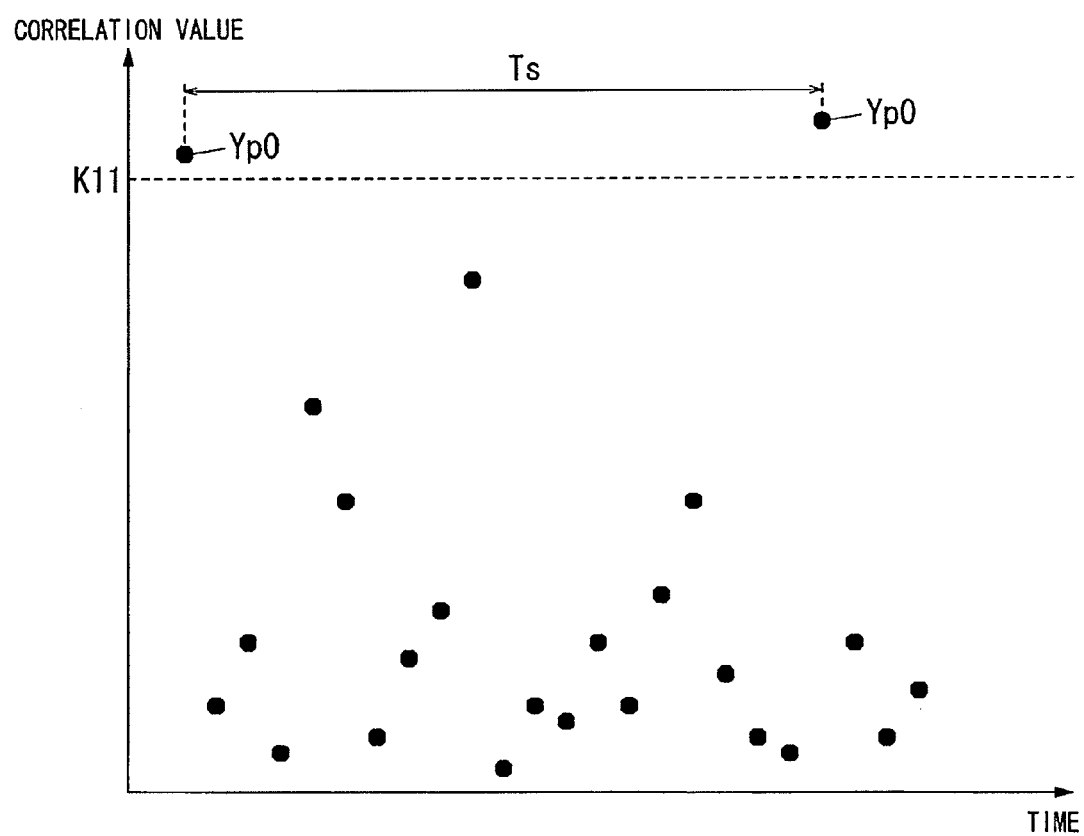
FIG. 14 is a plan view illustrating a correlation pattern according to Third Embodiment.

First, in the case of the transmission period Ts of the synchronization symbol Sa, as shown in FIG. 14, a correlation peak value Yp0 appears for each transmission period Ts. Therefore, the synchronization detection part 132 sets a correlation threshold K11 for detecting only the correlation peak value Yp0, and extracts correlation values that are equal to or more than the correlation threshold K11. Then, the synchronization detection part extracts, as a correlation peak value Yp0, each of the correlation values that are equal to or more than the correlation threshold K11, and detects, as the synchronization timing, an occurrence timing of the correlation peak value Yp0. Therefore, it is possible to perform the processing for detecting the synchronization timing by simple signal processing. Preferably, a condition for detecting the synchronization timing is that three correlation peak values or more continuously arranged at a prescribed period (in this case, the transmission period Ts of the synchronization symbol Sa) are equal to or more than the correlation threshold K11. In principle, it is desirable that differences between two correlation peak values or more be equal to or less than the difference threshold ΔK.

Fourth Embodiment

Figure 15:
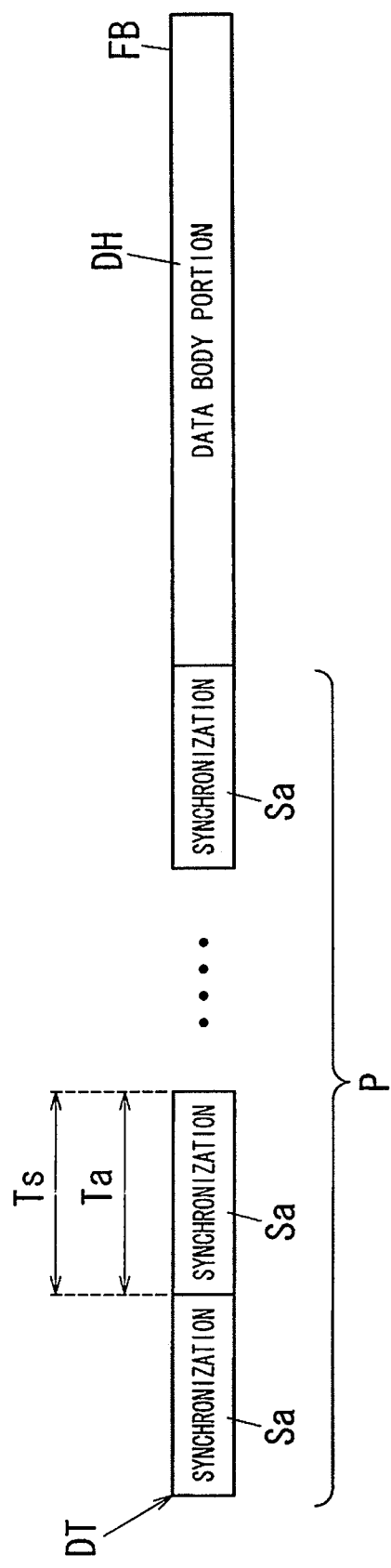
FIG. 15 is a frame structure diagram illustrating communication data according to Fourth Embodiment.

In the communication data DT according to the present embodiment, as shown in a communication frame FB of FIG. 15, the symbol length Ta of the synchronization symbol Sa is made variable, and thereby the transmission period Ts of the synchronization symbol Sa is set so as to be coincident with the integer multiple of the period of the disturbing wave. This method in which the symbol length Ta of the synchronization symbol Sa is made variable can be achieved by making a code length of the spread code Ca variable. The spread code Ca is used by the frame generation part 121 upon the spread modulation of the synchronization symbol Sa.

That is, it is possible to equalize the influence of the disturbing wave on each of all synchronization symbols Sa included in the communication data DT, and it is possible to substantively equalize a width by which the correlation peak value generated by the synchronization symbol Sa is fluctuated due to the disturbing wave. Therefore, because it is possible to prevent variation in the correlation peak values upon the reception of the communication data DT, it is possible to prevent influences by the disturbing wave having a periodicity, and to establish correct synchronization in the initial synchronization acquisition of the communication data DT.

Hereinafter, processing for setting the synchronization symbol Sa will be explained. Here the communication apparatus (first communication apparatus) A1 in FIG. 1A functions as a transmitter side, and the communication apparatus (second communication apparatus) A2 functions as a receiver side.

Figure 16A:
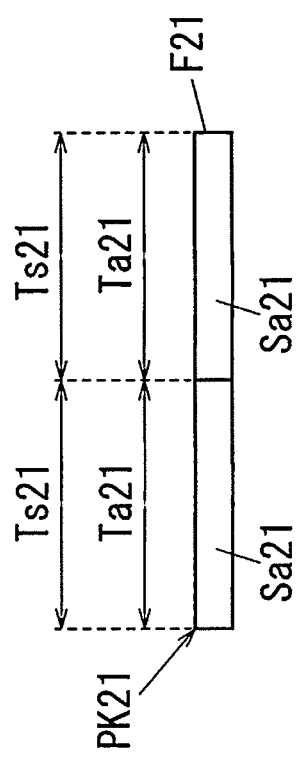
FIG. 16A is a frame structure diagram illustrating a test packet according to the Fourth Embodiment.
Figure 16:
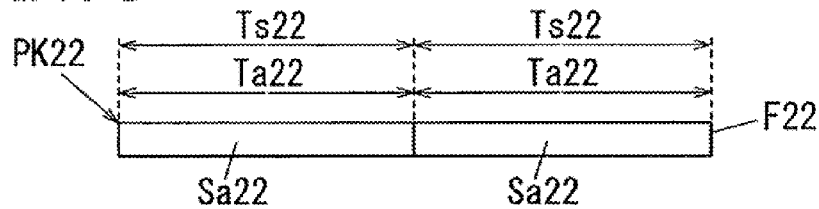
FIG. 16B is a frame structure diagram illustrating a test packet according to the Fourth Embodiment.
FIG. 16C is a frame structure diagram illustrating a test packet according to the Fourth Embodiment.
Figure 16:
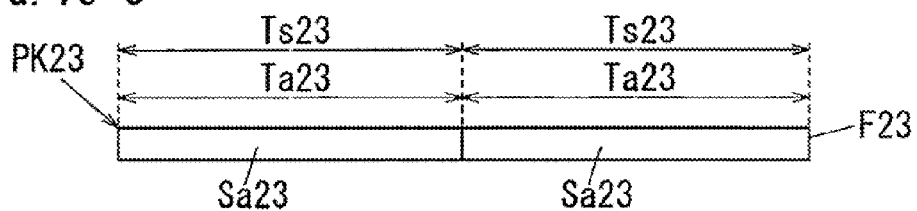

First, as shown in FIGS. 16A to 16C, the disturbing wave detection part 112 of the communication apparatus (first communication apparatus) A1 sequentially transmits, from the transmission unit 12, test packets PK (PK21, PK22, PK23 . . . ), in which the transmission period Ts of the synchronization symbol Sa has been fluctuated, using the communication frames (F21, F22, F23 . . . ), respectively. The synchronization symbols Sa of the communication frames (F21, F22, F23 . . . ) have different symbol lengths Ta (chip lengths).

For example, the test packet PK21 shown in FIG. 16A includes the communication frame F21 in which only a synchronization symbol Sa21 is continuously arranged a plurality of times. The number of chips of the synchronization symbol is "16". In this case, when the symbol length of the synchronization symbol Sa21 is denoted by "Ta21", the transmission period Ts21 of the synchronization symbol Sa21 is equal to "Ta21".

The test packet PK22 shown in FIG. 16B includes the communication frame F22 in which only a synchronization symbol Sa22 is continuously arranged a plurality of times. The number of chips of the synchronization symbol is "24". In this case, when the symbol length of the synchronization symbol Sa22 is denoted by "Ta22", the transmission period Ts22 of the synchronization symbol Sa22 is equal to "Ta22".

The test packet PK23 shown in FIG. 16C includes the communication frame F23 in which only a synchronization symbol Sa23 is continuously arranged a plurality of times. The number of chips of the synchronization symbol is "32". In this case, when the symbol length of the synchronization symbols Sa23 is denoted by "Ta23", the transmission period Ts23 of the synchronization symbols Sa23 is equal to "Ta23".

That is, the disturbing wave detection part 112 of the communication apparatus (first communication apparatus) A1 transmits a test packet PK sequentially selected from among a plurality of test packets PK. In this case, the transmission intervals between the synchronization symbols Sa in each of the plurality of test packets PK are different from the transmission intervals between the plurality of synchronization symbols Sa in the other test packets PK. The subsequent processing for detecting the synchronization timing is similar to that of the First Embodiment, and explanations thereof are omitted. In this case, calculation of the correlation value in the processing for detecting the synchronization timing is performed by using a plurality of reference signals having different code lengths. The number of chips of the synchronization symbol Sa used in each of the test packets PK is not limited to the above-mentioned number of chips, and is capable of being arbitrarily set.

Figure 17:
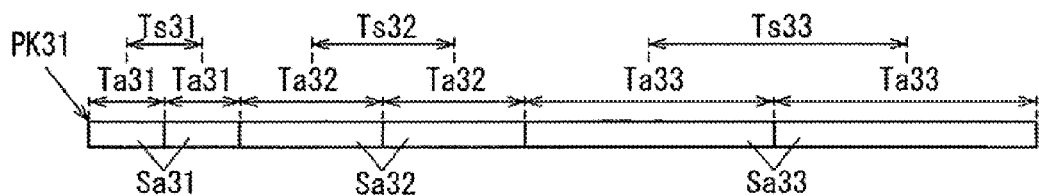
FIG. 17 is a frame structure diagram illustrating another test packet according to the Fourth Embodiment.
Figure 18:
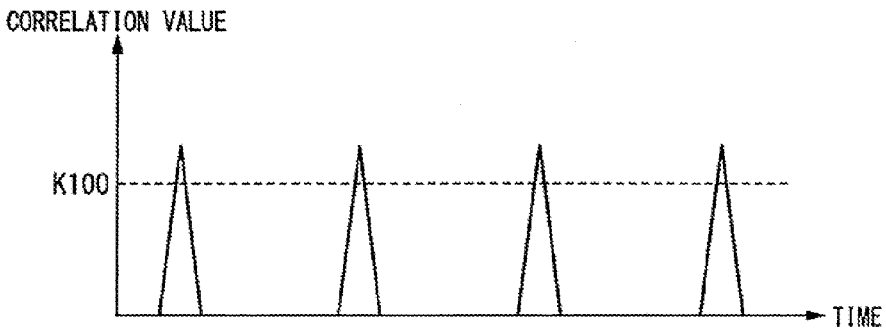
FIG. 18A is a schematic diagram illustrating conventional processing for establishing synchronization.
FIG. 18B is a schematic diagram illustrating conventional processing for establishing synchronization.
Figure 18:
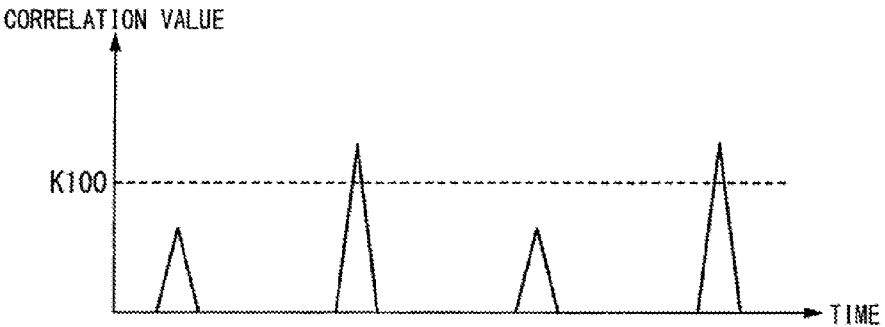

A test packet PK31 shown in FIG. 17 includes a plurality of sets having different symbol lengths Ta. Further, in each of the sets, two synchronization symbols Sa, of which symbol lengths Ta are equal to each other, are continuously arranged. Specifically, two synchronization symbols Sa31 having symbol lengths Ta31, two synchronization symbols Sa32 having symbol lengths Ta32, two synchronization symbols Sa33 having symbol lengths Ta33, and so on are continuously arranged, where the symbol lengths are set so as satisfy a relationship of "Ta31<Ta32<Ta33". In this case, a transmission period Ts31 of the synchronization symbol Sa31 is equal to "Ta31", a transmission period Ts32 of the synchronization symbol Sa32 is equal to "Ta32", and a transmission period Ts33 of the synchronization symbol Sa33 is equal to "Ta33". The transmission periods satisfy a relationship of "Ts31<Ts32<Ts33 . . . ".

In this case, any of the transmission periods Ts is coincident with the integer multiple of the period of the disturbing wave, and therefore, it is possible to determine the presence or absence of disturbing waves having a plurality of frequencies, through transmitting, one time, the test packet PK31 configured as above. The subsequent processing for detecting the synchronization timing is substantively similar to that of the First Embodiment, and explanations thereof are omitted. In each of the sets, three synchronization symbols or more of which symbol lengths Ta are equal to each other may be continuously arranged.

In each of the above-mentioned First to Fourth Embodiments, the communication control part 111 may set also a transmission period of each symbol included in the data body portion DH of the communication data DT to be the integer multiple of the period of the disturbing wave detected by the disturbing wave detection part 112. In this case, it is also possible to prevent influence by a disturbing wave having a periodicity on the data body portion DH, and to further improve the communication performance.

In each Embodiment, the correlation calculation part 131 calculates the correlation value between the communication data DT that has been converted into the intermediate frequency and the reference signal. Here, the correlation calculation part 131 may calculate a correlation value between the communication data DT that has been converted into a frequency other than the intermediate frequency and the reference signal.

Although the present invention has been described with reference to certain preferred embodiments, numerous modifications and variations can be made by those skilled in the art without departing from the true spirit and scope of this invention, namely claims.

The invention claimed is:

1. A communication system, comprising:
a first communication apparatus configured to perform frequency conversion of communication data, which includes at least first and second known synchronization symbols subjected to spread modulation with a spread code, into a first frequency, and to transmit the communication data; and
a second communication apparatus configured to perform frequency conversion of received communication data into a second frequency, and then to perform processing for detecting a synchronization timing, based on a plurality of correlation values arranged along a time series, each of which is a correlation value between the communication data and a reference signal that includes a known synchronization symbol,
wherein the first communication apparatus comprises:
a disturbing wave detection part configured to detect information relevant to a period of a disturbing wave in which the frequency conversion into the second frequency has been performed;
a communication control part configured to set a transmission period between a timing of transmitting the first known synchronization symbol and a timing of transmitting the second known synchronization symbol in the second frequency to be integer multiple of the period of a detected disturbing wave; and
a transmission unit configured to transmit the communication data in which the transmission period has been set by the communication control part.

2. The communication system according to claim 1,
wherein the communication control part is configured to add first and second interpolation symbols to the first and second known synchronization symbols, respectively,
the communication control part being configured to set a symbol length of the first and second interpolation symbols so that a sum of a symbol length of the first known synchronization symbol and a symbol length of the first interpolation symbol, in the second frequency, is integer multiple of the period of the detected disturbing wave, and a sum of a symbol length of the second known synchronization symbol and a symbol length of the second interpolation symbol, in the second frequency, is integer multiple of the period of the detected disturbing wave.

3. The communication system according to claim 2,
wherein each of the first and second interpolation symbols is set as data in which a correlation value between a reception sequence of the communication data including at least a part of each of the first and second interpolation symbols and the reference signal is the lowest.

4. The communication system according to claim 1,
wherein the transmission unit is configured to provide, when transmitting the communication data, a transmission operation stop period for stopping transmission operation from transmission of the first known synchronization symbol until transmission of the second known synchronization symbol next to the first known synchronization symbol, and
wherein the communication control part is configured to set a time length of the transmission operation stop period so that a sum of a symbol length of the first known synchronization symbol and the transmission operation stop period, in the second frequency, is integer multiple of the period of the detected disturbing wave.

5. The communication system according to claim 1,
wherein the communication control part is configured to set a symbol length of each of the first and second known synchronization symbols in the second frequency to be integer multiple of the period of the detected disturbing wave.

6. The communication system according to claim 1,
wherein the disturbing wave detection part is configured:
to transmit, from the transmission unit, a test packet sequentially selected from among a plurality of test packets, each in which transmission intervals between a plurality of known synchronization symbols are set constant in a single communication frame, the transmission intervals between the plurality of known synchronization symbols in each of the plurality of test packets being different from the transmission intervals between the plurality of known synchronization symbols in the other test packets; and to determine, when receiving a return signal which is returned by the second communication apparatus, which has received the test packet, upon detecting the synchronization timing, that each of the transmission intervals between the plurality of known synchronization symbols of the test packet in the second frequency triggering the return signal is integer multiple of the period of the disturbing wave in which the frequency conversion into the second frequency has been performed, and then to stop processing for transmitting the test packet.

7. The communication system according to claim 6, wherein the second communication apparatus is configured to detect, as the synchronization timing, a timing in which a difference between at least two correlation values is equal to or less than a difference threshold, from among a plurality of timings in which two or more correlation values of the plurality of correlation values are equal to or more than a lower limit threshold.

8. The communication system according to claim 6, wherein the second communication apparatus is configured to detect the synchronization timing, when the correlation value between the received communication data and the reference signal is equal to or more than a correlation threshold.

9. The communication system according to claim 1, wherein the disturbing wave detection part of the first communication apparatus is configured to transmit, from the transmission unit, a test packet sequentially selected from among a plurality of test packets, each in which transmission intervals between a plurality of known synchronization symbols are set constant in a single communication frame,
the transmission intervals between the plurality of known synchronization symbols in each of the plurality of test packets being different from the transmission intervals between the plurality of known synchronization symbols in the other test packets, wherein the second communication apparatus is configured: to perform processing for detecting the synchronization timing with a received test packet; to add period information relevant to a detected period of the synchronization timing into a return signal; and to return the return signal, and
wherein the disturbing wave detection part of the first communication apparatus is configured to determine that the detected period of the synchronization timing in the second frequency is integer multiple of the period of the disturbing wave in which the frequency conversion into the second frequency has been performed, based on the period information added into the return signal, and then to stop processing for transmitting the test packet.

10. The communication system according to claim 1, wherein the disturbing wave detection part of the first communication apparatus is configured to transmit, from the transmission unit, a test packet sequentially selected from among a plurality of test packets, each in which transmission intervals between a plurality of known synchronization symbols are set constant in a single communication frame,
the transmission intervals between the plurality of known synchronization symbols in each of the plurality of test packets being different from the transmission intervals between the plurality of known synchronization symbols in the other test packets,
wherein the second communication apparatus is configured: to perform processing for detecting the synchronization timing with a received test packet; to add period information relevant to a detected period of the synchronization timing into a return signal; and to return the return signal with the detected period of the synchronization timing, and
wherein the disturbing wave detection part of the first communication apparatus is configured to determine, when a received period of the return signal in the second frequency is coincident with the period information added into the return signal, that the received period of the return signal in the second frequency is integer multiple of the period of the disturbing wave in which the frequency conversion into the second frequency has been performed, and then to stop processing for transmitting the test packet.

11. The communication system according to claim 1, wherein the disturbing wave detection part of the first communication apparatus is configured to transmit, from the transmission unit, a test packet, in which transmission intervals between a plurality of known synchronization symbols are set different from each other in a single communication frame,
wherein the second communication apparatus is configured: to perform processing for detecting the synchronization timing with a received test packet; and to return a return signal with a detected period of the synchronization timing, and
wherein the disturbing wave detection part of the first communication apparatus is configured to determine that a received period of the return signal in the second frequency is integer multiple of the period of the disturbing wave in which the frequency conversion into the second frequency has been performed.

12. The communication system according to claim 1, wherein the disturbing wave detection part of the first communication apparatus is configured to transmit, from the transmission unit, a test packet, in which transmission intervals between a plurality of known synchronization symbols are set different from each other in a single communication frame,
wherein the second communication apparatus is configured: to perform processing for detecting the synchronization timing with a received test packet; to add period information relevant to a detected period of the synchronization timing into a return signal; and to return the return signal, and
wherein the disturbing wave detection part of the first communication apparatus is configured to determine that the detected period of the synchronization timing in the second frequency is integer multiple of the period of the disturbing wave in which the frequency conversion into the second frequency has been performed, based on the period information added into the return signal.

13. The communication system according to claim 1, wherein the disturbing wave detection part of the first communication apparatus is configured to transmit, from the transmission unit, a test packet, in which transmission intervals between a plurality of known synchronization symbols are set different from each other in a single communication frame,
wherein the second communication apparatus is configured: to perform processing for detecting the synchronization timing with a received test packet;

to add period information relevant to a detected period of the synchronization timing into a return signal; and to return the return signal with the detected period of the synchronization timing, and wherein the disturbing wave detection part of the first communication apparatus is configured to determine, when a received period of the return signal in the second frequency is coincident with the period information added into the return signal, that the received period of the return signal in the second frequency is integer multiple of the period of the disturbing wave in which the frequency conversion into the second frequency has been performed.

14. The communication system according to claim 1, wherein the disturbing wave detection part is configured to again detect the information relevant to the period of the disturbing wave, in a case where, after the communication control part has set the transmission period to be integer multiple of the period of the detected disturbing wave, an incommunicable state has continued between the first and second communication apparatuses during a predetermined time or more.

15. The communication system according to claim 14, wherein, the disturbing wave detection part is configured:

to transmit, in the case where again detecting the information relevant to the period of the disturbing wave, from the transmission unit, a test packet in which the transmission period has been set to be integer multiple of the period of a previous detected disturbing wave;

to detect, when receiving a return signal which is returned by the second communication apparatus, which has received the test packet, upon detecting the synchronization timing, information relevant to the period of the disturbing wave in which the frequency conversion into the second frequency has been performed, based on the return signal; and to transmit, when not receiving the return signal from the second communication apparatus, from the transmission unit, another test packet in which the transmission period has been changed.

16. The communication system according to claim 1, wherein the communication control part is configured to set a transmission period of a symbol, in the second frequency, other than the first and second known synchronization symbols in the communication data to be integer multiple of the period of the detected disturbing wave.

17. A communication method, in which a first communication apparatus is configured to perform frequency conversion of communication data, which includes at least first and second known synchronization symbols subjected to spread modulation with a spread code, into a first frequency, and to transmit the communication data, and a second communication apparatus that has received the communication data is configured to perform frequency conversion of received communication data into a second frequency, and then to perform processing for detecting a synchronization timing, based on a plurality of correlation values arranged along a time series, each of which is a correlation value between the communication data and a reference signal that includes a known synchronization symbol, wherein the first communication apparatus comprises the steps of:

detecting information relevant to a period of a disturbing wave in which the frequency conversion into the second frequency has been performed; and transmitting the communication data in which a transmission period between a timing of transmitting the first known synchronization symbol and a timing of transmitting the second known synchronization symbol in the second frequency has been set to be integer multiple of the period of a detected disturbing wave.

* * * * *